(12) United States Patent
Marcovitch et al.

(10) Patent No.: US 12,216,575 B2
(45) Date of Patent: *Feb. 4, 2025

(54) PATTERNED MEMORY-NETWORK DATA TRANSFER

(71) Applicant: MELLANOX TECHNOLOGIES, LTD., Yokneam (IL)

(72) Inventors: Daniel Marcovitch, Yokneam Illit (IL); Gil Bloch, Zichron Yaakov (IL); Richard Graham, Knoxville, TN (US); Yossef Itigin, Hod Hasharon (IL); Ortal Ben Moshe, Moshav Ein Haemek (IL); Roman Nudelman, Kiryat Bialik (IL)

(73) Assignee: Mellanox Technologies, Ltd, Yokneam (IL)

( * ) Notice: Subject to any disclaimer, the term of this patent is extended or adjusted under 35 U.S.C. 154(b) by 45 days.

This patent is subject to a terminal disclaimer.

(21) Appl. No.: 17/858,104

(22) Filed: Jul. 6, 2022

(65) Prior Publication Data
US 2024/0012753 A1    Jan. 11, 2024

(51) Int. Cl.
| | |
|---|---|
| G06F 12/06 | (2006.01) |
| G06F 12/0831 | (2016.01) |
| G06F 13/40 | (2006.01) |
| G06F 15/173 | (2006.01) |

(52) U.S. Cl.
CPC ...... *G06F 12/0653* (2013.01); *G06F 12/0835* (2013.01); *G06F 13/4027* (2013.01); *G06F 15/17331* (2013.01)

(58) Field of Classification Search
None
See application file for complete search history.

(56) References Cited

U.S. PATENT DOCUMENTS

| | | |
|---|---|---|
| 4,783,698 A | 11/1988 | Harney |
| 4,783,736 A | 11/1988 | Ziegler et al. |
| 5,668,809 A | 9/1997 | Rostoker et al. |
| 5,949,441 A | 9/1999 | Ristau |
| 6,041,397 A | 3/2000 | Rickard et al. |
| 6,097,734 A | 8/2000 | Gotesman et al. |
| 6,157,955 A | 12/2000 | Narad et al. |
| 6,321,276 B1 | 11/2001 | Forin |
| 6,766,467 B1 | 7/2004 | Neal et al. |
| 6,786,143 B2 | 9/2004 | Craddock et al. |

(Continued)

OTHER PUBLICATIONS

U.S. Appl. No. 17/824,954 Office Action dated Apr. 28, 2023.

(Continued)

*Primary Examiner* — Yaima Rigol
(74) *Attorney, Agent, or Firm* — Meitar Patents Ltd.; Daniel Kligler

(57) ABSTRACT

A network device includes a first interface, a second interface, and circuitry. The first interface is configured to communicate at least with a memory. The second interface is configured to communicate over a network with a peer network device. The circuitry is configured to receive a request to transfer data over the network between the memory and the peer network device in accordance with (i) a pattern of offsets to be accessed in the memory and (ii) a memory key representing a memory space to be accessed using the pattern, and to transfer the data in accordance with the request.

26 Claims, 25 Drawing Sheets

(56) References Cited

U.S. PATENT DOCUMENTS

| | | |
|---|---|---|
| 6,981,027 B1 | 12/2005 | Gallo et al. |
| 7,171,484 B1 | 1/2007 | Krause et al. |
| 7,263,103 B2 | 8/2007 | Kagan et al. |
| 7,298,746 B1 | 11/2007 | De La Iglesia et al. |
| 7,299,266 B2 | 11/2007 | Boyd et al. |
| 7,464,198 B2 | 12/2008 | Martinez et al. |
| 7,522,606 B1 | 4/2009 | Sendrovitz |
| 7,733,464 B2 | 6/2010 | David et al. |
| 7,760,741 B2 | 7/2010 | Biran et al. |
| 7,881,496 B2 | 2/2011 | Camilleri et al. |
| 7,930,422 B2 | 4/2011 | Freimuth et al. |
| 8,051,212 B2 | 11/2011 | Kagan et al. |
| 8,176,252 B1 | 5/2012 | Alexander et al. |
| 8,218,770 B2 | 7/2012 | Arulambalam et al. |
| 8,495,301 B1 | 7/2013 | Alexander et al. |
| 8,638,796 B2 | 1/2014 | Dan et al. |
| 8,682,108 B2 | 3/2014 | Tian et al. |
| 8,693,551 B2 | 4/2014 | Zheludkov et al. |
| 8,751,701 B2 | 6/2014 | Shahar et al. |
| 9,128,924 B2 | 9/2015 | Tsadik et al. |
| 9,131,235 B2 | 9/2015 | Zheludkov et al. |
| 9,143,467 B2 | 9/2015 | Kagan et al. |
| 9,270,299 B2 | 2/2016 | Luby et al. |
| 9,367,746 B2 | 6/2016 | Ishihara |
| 9,451,266 B2 | 9/2016 | Zheludkov et al. |
| 9,767,529 B1 | 9/2017 | Liu et al. |
| 10,210,125 B2 | 2/2019 | Burstein |
| 10,516,710 B2 | 12/2019 | Levi et al. |
| 10,637,828 B2 | 4/2020 | Kahalon et al. |
| 10,735,339 B1 | 8/2020 | Matthews et al. |
| 11,190,462 B2 | 11/2021 | Levi et al. |
| 11,531,633 B2 | 12/2022 | Sikka et al. |
| 11,669,464 B1 | 6/2023 | Bilski et al. |
| 2002/0041089 A1 | 4/2002 | Yasui |
| 2002/0152327 A1 | 10/2002 | Kagan et al. |
| 2003/0005164 A1 | 1/2003 | Trainin |
| 2003/0046530 A1 | 3/2003 | Poznanovic |
| 2004/0013117 A1 | 1/2004 | Hendel et al. |
| 2004/0042483 A1 | 3/2004 | Elzur et al. |
| 2004/0073769 A1* | 4/2004 | Debes .............. G06T 1/60 711/217 |
| 2004/0146203 A1 | 7/2004 | Yoshimura et al. |
| 2004/0156379 A1 | 8/2004 | Walls et al. |
| 2004/0165091 A1 | 8/2004 | Takemura et al. |
| 2004/0221128 A1 | 11/2004 | Beecroft et al. |
| 2004/0230979 A1 | 11/2004 | Beecroft et al. |
| 2005/0135395 A1 | 6/2005 | Fan et al. |
| 2005/0135415 A1 | 6/2005 | Fan et al. |
| 2006/0075119 A1 | 4/2006 | Hussain et al. |
| 2006/0180670 A1 | 8/2006 | Acosta et al. |
| 2006/0256851 A1 | 11/2006 | Wang et al. |
| 2007/0124378 A1 | 5/2007 | Elzur |
| 2007/0162619 A1 | 7/2007 | Aloni et al. |
| 2007/0208820 A1 | 9/2007 | Makhervaks et al. |
| 2007/0211157 A1 | 9/2007 | Humpoletz et al. |
| 2007/0296849 A1 | 12/2007 | Sano et al. |
| 2008/0109562 A1 | 5/2008 | Ramakrishnan et al. |
| 2008/0143732 A1 | 6/2008 | Shiozaki |
| 2009/0021612 A1 | 1/2009 | Hamilton, Jr. et al. |
| 2009/0034633 A1 | 2/2009 | Rodriguez et al. |
| 2009/0074079 A1 | 3/2009 | Lee et al. |
| 2009/0083517 A1 | 3/2009 | Riddle |
| 2009/0153699 A1 | 6/2009 | Satoh et al. |
| 2009/0244288 A1 | 10/2009 | Fujimoto et al. |
| 2010/0121971 A1 | 5/2010 | Shao et al. |
| 2010/0149393 A1 | 6/2010 | Zarnowski et al. |
| 2010/0262973 A1 | 10/2010 | Ernst et al. |
| 2010/0265316 A1 | 10/2010 | Sali et al. |
| 2010/0274876 A1 | 10/2010 | Kagan et al. |
| 2010/0281192 A1 | 11/2010 | Rakib et al. |
| 2011/0268194 A1 | 11/2011 | Nagano |
| 2011/0283156 A1 | 11/2011 | Hiie |
| 2012/0020413 A1 | 1/2012 | Chen et al. |
| 2012/0030451 A1 | 2/2012 | Pong et al. |
| 2012/0033039 A1 | 2/2012 | Sasaki et al. |
| 2012/0147975 A1 | 6/2012 | Ju |
| 2013/0067193 A1 | 3/2013 | Kagan et al. |
| 2013/0191549 A1 | 7/2013 | Williams et al. |
| 2013/0322753 A1 | 12/2013 | Lim et al. |
| 2013/0329006 A1 | 12/2013 | Boles et al. |
| 2014/0068168 A1 | 3/2014 | Murrin et al. |
| 2014/0201587 A1 | 7/2014 | Luby et al. |
| 2014/0269893 A1 | 9/2014 | Parikh et al. |
| 2015/0026542 A1 | 1/2015 | Brennum |
| 2015/0063358 A1 | 3/2015 | Wu et al. |
| 2015/0085863 A1 | 3/2015 | Wu et al. |
| 2015/0181211 A1 | 6/2015 | He |
| 2015/0261434 A1* | 9/2015 | Kagan .............. G06F 13/28 711/103 |
| 2015/0373075 A1 | 12/2015 | Perlman et al. |
| 2016/0080755 A1 | 3/2016 | Toma et al. |
| 2016/0277473 A1 | 9/2016 | Botsford et al. |
| 2016/0337426 A1 | 11/2016 | Shribman et al. |
| 2017/0171167 A1 | 6/2017 | Suzuki |
| 2017/0242590 A1 | 8/2017 | Gokhale et al. |
| 2018/0367525 A1 | 12/2018 | Kassimis et al. |
| 2018/0367589 A1 | 12/2018 | Levi et al. |
| 2019/0018785 A1 | 1/2019 | Beard et al. |
| 2020/0076521 A1 | 3/2020 | Hammond |
| 2020/0245016 A1 | 7/2020 | Levi et al. |
| 2020/0341940 A1 | 10/2020 | Parambil et al. |
| 2021/0049097 A1 | 2/2021 | Fang et al. |
| 2022/0070797 A1 | 3/2022 | Berg et al. |
| 2022/0086105 A1 | 3/2022 | Levi et al. |
| 2022/0095007 A1 | 3/2022 | Levi et al. |
| 2022/0158955 A1 | 5/2022 | Yeh et al. |
| 2022/0283964 A1 | 9/2022 | Burstein et al. |
| 2022/0413886 A1 | 12/2022 | Griffy et al. |

OTHER PUBLICATIONS

U.S. Appl. No. 17/858,097 Office Action dated Aug. 9, 2023.
U.S. Appl. No. 17/858,102 Office Action dated Oct. 24, 2023.
Infiniband Trade Association, "InfiniBandTM Architecture Specification", vol. 1, release 1.2.1, pp. 1-1727, Nov. 2007.
"MPI: A Message-Passing Interface Standard", version 2.2, Message Passing Interface Forum, pp. 1-647, Sep. 4, 2009.
Shah et al., "Direct Data Placement over Reliable Transports", IETF Network Working Group, RFC 5041, pp. 1-38, Oct. 2007.
Culley et al., "Marker PDU Aligned Framing for TCP Specification", IETF Network Working Group, RFC 5044, pp. 1-74, Oct. 2007.
"Linux kernel enable the IOMMU—input/output memory management unit support", pp. 1-2, Oct. 15, 2007, as downloaded from http://www.cyberciti.biz/tips/howto-turn-on-linux-software-iommu-support.html.
SMPTE Standard 2110-20:2017, "Professional Media Over Managed IP Networks: Uncompressed Active Video", The Society of Motion Picture and Television Engineers, pp. 1-23, Aug. 10, 2017.
SMPTE Standard 2110-30:201y, "Professional Media over IP Networks—PCM Digital Audio", The Society of Motion Picture and Television Engineers, pp. 1-7, Jan. 26, 2017.
SMPTE Standard 2110-21:201y, "Professional Media Over IP Networks: Timing Model for Uncompressed Active Video", The Society of Motion Picture and Television Engineers, pp. 1-15, Jan. 18, 2017.
SMPTE Standard 2110-10:201y, "Professional Media over IP Networks: System Timing and Definitions", The Society of Motion Picture and Television Engineers, pp. 1-12, Jan. 26, 2017.
Wikipedia, "Common Public Radio Interface", pp. 1-1, last edited Apr. 28, 2017, as downloaded from https://web.archive.org/web/20190620212239/https://en.wikipedia.org/wiki/Common_Public_Radio_Interface.
O-RAN Alliance, "O-RAN Fronthaul Working Group: Control, User and Synchronization Plane Specification", ORAN-WG4.CUS.0-v01.00 Technical Specification, pp. 1-189, year 2019.
Wikipedia, "evolved Common Public Radio Interface (eCPRI)", pp. 1-3, May 13, 2019, as downloaded from https://web.archive.org/web/20190513130801/https://wiki.wireshark.org/eCPRI.

(56) References Cited

OTHER PUBLICATIONS

Main Concept, "MainConcept Accelerates HEVC Encoding with NVIDIA RTX GPUs", newsletter, pp. 1-4, Apr. 8, 2019, as downloaded from https://www.mainconcept.com/company/news/news-article/article/mainconcept-accelerates-hevc-encoding-with-nvidia-rtx-gpus.html.
Marcovitch et al., U.S. Appl. No. 17/590,339, filed Feb. 1, 2022.
Baker et al., "OpenSHMEM Application Programming Interface," version 1.5, www.openshmem.org, pp. 1-180, Jun. 8, 2020.
Marcovitch et al, U.S. Appl. No. 17/858,102, filed Jul. 6, 2022.
Pismenny et al., U.S. Appl. No. 17/824,954, filed May 26, 2022.
Marcovitch et al, U.S. Appl. No. 17/858,097, filed Jul. 6, 2022.
Schulzrinne et al., "RTP: A Transport Protocol for Real-Time Applications," Request for Comments 3550, pp. 1-104, Jul. 2003.
SMPTE Standard 2022-6:2012—"Transport of High Bit Rate Media Signals over IP Networks (HBRMT)", The Society of Motion Picture and Television Engineers, pp. 1-16, Oct. 9, 2012.
Sjoberg et al., "RTP Payload Format and File Storage Format for the Adaptive Multi-Rate (AMR) and Adaptive Multi-Rate Wideband (AMR-WB) Audio Codecs," Network Working Group, Request for Comments 4867, pp. 1-59, Apr. 2007.
U.S. Appl. No. 17/542,426 Office Action dated Nov. 4, 2022.
U.S. Appl. No. 17/858,097 Office Action dated Dec. 13, 2023.
Brock et al., in "RDMA vs. RPC for Implementing Distributed Data Structures," Proceedings of the 2019 IEEE/ACM 9th Workshop on Irregular Applications: Architectures and Algorithms (IA3), pp. 17-22, Nov. 2019.
U.S. Appl. No. 17/858,097 Office Action dated Mar. 15, 2024.
U.S. Appl. No. 17/858,102 Office Action dated May 9, 2024.

\* cited by examiner

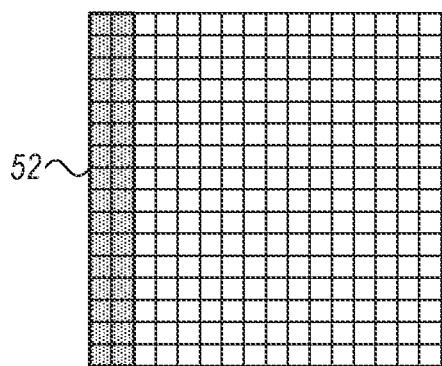
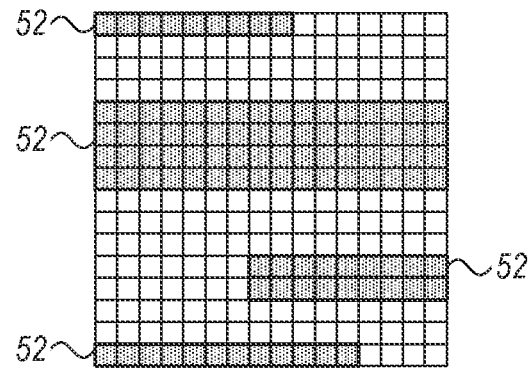
FIG. 3A  FIG. 3B
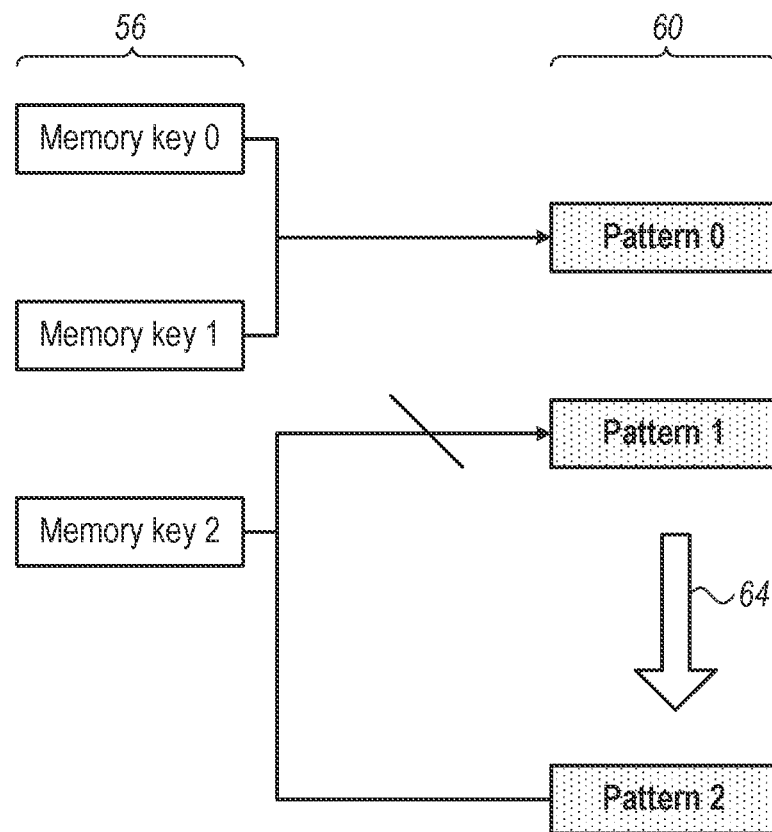
FIG. 4

PATTERNED MEMORY-NETWORK DATA TRANSFER

CROSS-REFERENCE TO RELATED APPLICATIONS

This application is related to U.S. patent application Ser. No. 17/858,097 entitled "Patterned Remote Direct Memory Access (RDMA)," and to U.S. patent application Ser. No. 17/858,012 entitled "Patterned Direct Memory Access (DMA)," whose disclosures are incorporated herein by reference.

FIELD OF THE INVENTION

The present invention relates generally to data transfer, and particularly to methods and systems for patterned data transfer using Direct Memory Access (DMA) and Remote Direct Memory Access (RDMA), and patterned data transfer between a memory and a network.

BACKGROUND OF THE INVENTION

Direct Memory Access (DMA) is a technique for transferring data directly between memories with minimal host involvement. Remote Direct Memory Access (RDMA) is a technique for transferring data directly between memories across a network. RDMA is commonly deployed in InfiniBand (IB) networks, and also in Ethernet networks using RDMA over Converged Ethernet (ROCE).

SUMMARY OF THE INVENTION

An embodiment of the present invention that is described herein provides a network device including a first interface, a second interface and circuitry. The first interface is configured to communicate at least with a first memory. The second interface is configured to communicate over a network with a peer network device coupled to a second memory. The circuitry is configured to (i) receive a request to transfer data over the network between the first memory and the second memory in accordance with a pattern of offsets to be accessed in the first memory or in the second memory, and (ii) transfer the data in accordance with the request.

In some embodiments the circuitry is configured to receive the request as a work-request via the first interface. In other embodiments the circuitry is configured to receive the request as a command over the network from the peer network device. In some disclosed embodiments, the pattern includes one of (i) a pattern that accesses a contiguous memory space, (ii) a pattern that accesses a non-contiguous memory space, and (iii) a strided pattern.

In some embodiments, the request further specifies a memory key representing a memory space to be accessed using the pattern. In an embodiment, the request specifies multiple memory keys representing respective memory spaces to be accessed using the pattern. In another embodiment, the memory space represented by the memory key is one of a virtual memory space and a physical memory space.

In yet another embodiment, the pattern and the memory key are pre-registered, and also pre-associated with one another, in one or both of the network device and the peer network device, and the request specifies the memory key but not the pattern. In an example embodiment, in response to receiving a re-association instruction, the circuitry is configured to associate the memory key with a different pattern. In an embodiment, the pattern is pre-associated with at least one additional memory key, in one or both of the network device and the peer network device.

In still another embodiment, in one or both of the network device and the peer network device, the pattern and the memory key are pre-registered but not associated with one another, and the request specifies the memory key and an identifier of the pattern. In a disclosed embodiment, the memory key is pre-registered in one or both of the network device and the peer network device, and the request specifies the memory key and a description of the pattern.

In an embodiment, the request specifies a starting initial offset parameter for the virtual address or pattern. In another embodiment, the pattern specifies the offsets using a nested representation that includes at least one internal pattern. In yet another embodiment, the pattern specifies the offsets using an iterative representation that defines (i) a basic pattern to be iterated multiple times, (ii) a number of times the basic pattern is to be iterated, and (iii) an offset between successive iterations of the basic pattern.

In some embodiments, the request is associated with a Remote Direct Memory Access (RDMA) Read, RDMA Write, RDMA Atomic or RDMA Send or RDMA Receive command. In other embodiments the request is associated with a scatter or gather command. In some embodiments the request is associated with an InfiniBand transaction. In other embodiments, the request is associated with a Remote Direct Memory Access (RDMA) over Converged Ethernet (ROCE) transaction.

There is additionally provided, in accordance with an embodiment of the present invention, a method for data transfer including, in a network device, communicating with a first memory and, over a network, with a peer network device coupled to a second memory. A request is received in the network device to transfer data over the network between the first memory and the second memory in accordance with a pattern of offsets to be accessed in the first memory or in the second memory. The data is transferred in accordance with the request.

There is also provided, in accordance with an embodiment of the present invention, a Direct Memory Access (DMA) device including an interface and a DMA engine. The interface is configured to communicate with a first memory and with a second memory. The DMA engine is configured to (i) receive a request to transfer data between the first memory and the second memory in accordance with a pattern of offsets to be accessed in the first memory or in the second memory, and (ii) transfer the data in accordance with the request.

In various embodiments, the pattern includes one of (i) a pattern that accesses a contiguous memory space, (ii) a pattern that accesses a non-contiguous memory space, and (iii) a strided pattern. In an embodiment, the request further specifies a memory key representing a memory space to be accessed using the pattern. In an example embodiment, the request specifies multiple memory keys representing respective memory spaces to be accessed using the pattern. In another embodiment, the memory space represented by the memory key is one of a virtual memory space and a physical memory space.

In a disclosed embodiment, the pattern and the memory key are pre-registered, and also pre-associated with one another, in the device, and the request specifies the memory key but not the pattern. In an example embodiment, in response to receiving a re-association instruction, the DMA engine is configured to associate the memory key with a different pattern. In another embodiment, the pattern is pre-associated with at least one additional memory key.

In another embodiment, the pattern and the memory key are pre-registered but not associated with one another, and the request specifies the memory key and an identifier of the pattern. In yet another embodiment, the memory key is pre-registered, and the request specifies the memory key and a description of the pattern.

In an embodiment, the request specifies a starting virtual address or initial offset parameter for the pattern. In another embodiment, the pattern specifies the offsets using a nested representation that includes at least one internal pattern. In yet another embodiment, the pattern specifies the offsets using an iterative representation that defines (i) a basic pattern to be iterated multiple times, (ii) a number of times the basic pattern is to be iterated, and (iii) an offset between successive iterations of the basic pattern. In disclosed embodiments, the request is associated with a scatter or gather command.

There is further provided, in accordance with an embodiment of the present invention, a method for data transfer including, in a Direct Memory Access (DMA) device, communicating with a first memory and with a second memory. A request is received in the DMA device to transfer data between the first memory and the second memory in accordance with a pattern of offsets to be accessed in the first memory or in the second memory. The data is transferred in accordance with the request.

There is additionally provided, in accordance with an embodiment of the present invention, a network device including a first interface, a second interface, and circuitry. The first interface is configured to communicate at least with a memory. The second interface is configured to communicate over a network with a peer network device. The circuitry is configured to receive a request to transfer data over the network between the memory and the peer network device in accordance with (i) a pattern of offsets to be accessed in the memory and (ii) a memory key representing a memory space to be accessed using the pattern, and to transfer the data in accordance with the request.

In some embodiments, the circuitry is configured to receive the request as a work-request via the first interface. In some embodiments, the pattern includes one of (i) a pattern that accesses a contiguous memory space, (ii) a pattern that accesses a non-contiguous memory space, and (iii) a strided pattern. In some embodiments, the request specifies multiple memory keys representing respective memory spaces to be accessed using the pattern. In example embodiments, the memory space represented by the memory key is one of a virtual memory space and a physical memory space.

In some embodiments, the pattern and the memory key are pre-registered, and also pre-associated with one another, in the network device, and the request specifies the memory key but not the pattern. In an example embodiment, in response to receiving a re-association instruction, the circuitry is configured to associate the memory key with a different pattern. In another embodiment, the pattern is pre-associated in the network device with at least one additional memory key. In yet another embodiment, in the network device, the pattern and the memory key are pre-registered but not associated with one another, and the request specifies the memory key and an identifier of the pattern.

In other embodiments, the memory key is pre-registered in the network device, and the request specifies the memory key and a description of the pattern. In yet other embodiments, the request specifies a starting virtual address or initial offset parameter for the pattern. In some embodiments, the pattern specifies the offsets using a nested representation that includes at least one internal pattern. In still other embodiments, the pattern specifies the offsets using an iterative representation that defines (i) a basic pattern to be iterated multiple times, (ii) a number of times the basic pattern is to be iterated, and (iii) an offset between successive iterations of the basic pattern.

In an embodiment, the request is associated with a scatter or gather command. In an embodiment, the request is associated with an InfiniBand transaction. In another embodiment, the request is associated with an Ethernet transaction.

There is also provided, in accordance with an embodiment of the present invention, a method for data transfer including, in a network device, communicating with a memory and, over a network, with a peer network device. A request is received in the network device to transfer data over the network between the memory and the peer network device in accordance with (i) a pattern of offsets to be accessed in the memory and (ii) a memory key representing a memory space to be accessed using the pattern. The data is transferred in accordance with the request.

The present invention will be more fully understood from the following detailed description of the embodiments thereof, taken together with the drawings in which:

BRIEF DESCRIPTION OF THE DRAWINGS

FIGS. 3A and 3B are diagrams that schematically illustrate examples of memory patterns, in accordance with embodiments of the present invention;

FIG. 4 is a diagram that schematically illustrates pre-registration, pre-association and re-association of memory keys and patterns, in accordance with an embodiment of the present invention;

DETAILED DESCRIPTION OF EMBODIMENTS

Overview

Figure 1A:
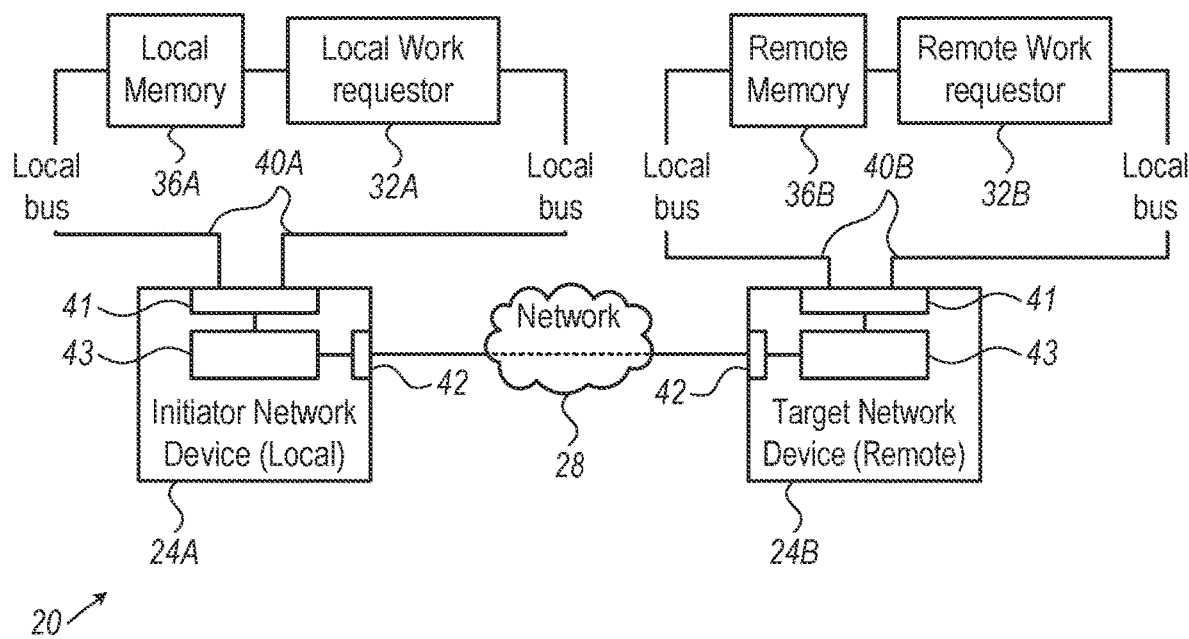
FIG. 1A is a block diagram that schematically illustrates a communication system that uses patterned RDMA, in accordance with an embodiment of the present invention.

In many practical cases, data that is to be transferred using DMA or RDMA is not contiguous in memory, on the source or initiator side, on the destination or target side, or both. In some cases the data is to be read from or written to a periodic pattern of addresses, e.g., when reading or writing a certain column of a matrix. In other cases, the pattern comprises an a-periodic, arbitrary list of addresses.

Embodiments of the present invention that are described herein provide improved methods and systems for transferring data between memories, over a network using RDMA or locally using DMA. Although particularly useful for transferring data to and/or from non-contiguous memory addresses, the disclosed techniques are applicable regardless of the data location or organization.

In some embodiments, a communication system comprises a pair of network devices, e.g., InfiniBand Host Channel Adapters (HCAs) or Ethernet Network Interface Controllers (NICs), connected to a network. Each network device is connected to a respective memory via a local bus. The network devices transfer data between the memories, over the network, using RDMA.

In a given RDMA transaction, the network devices transfer data from one memory space (in one of the memories) to another memory space (in the other memory). A given memory space comprises multiple physical memory pages having respective physical addresses. The physical memory space is mapped onto a virtual memory space, i.e., a contiguous range of virtual addresses. The virtual memory space is represented by an identifier that is referred to herein as a "memory key" or simply "key" for brevity.

In some disclosed embodiments, the initiator of a given RDMA transaction specifies not only a key, but also a pattern. In the present context, the term "pattern" means a set of offsets (also referred to as "displacements" or "strides") in which the data of the transaction is to be accessed (read from or written to, as appropriate). The offsets may be given relative to some reference point (e.g., a base virtual address), and/or differentially relative to one another. A pattern may be periodic or a-periodic (i.e., define a periodic or a-periodic set of offsets), contiguous or non-contiguous (i.e., define a contiguous or non-contiguous set of offsets).

In various embodiments, the pattern and key may pertain to the memory from which the data is to be read, or to the memory into which the data is to be written. The memory in question may be local or remote (relative to the initiator). In some embodiments the initiator specifies two {key, pattern} pairs, one pair for reading the data from one memory (local or remote), and the other pair for writing the data to the other memory. Any suitable RDMA command, e.g., Read, Write, Atomic, Send or receive, can be performed in this manner. It is noted that the disclosed techniques are not limited to RDMA and can be applied more generally, e.g., in processing of scatter and/or gather commands. Generally, a pattern can access memory mapped by multiple keys, i.e., a given request may specify one or more keys along with a pattern.

One possible way of initiating RDMA transactions is to simply specify the key and the pattern independently per transaction. This solution, however, is expensive in terms of memory and computational complexity, especially for complex patterns. In some disclosed embodiments, this overhead is reduced considerably by allowing a network device (initiator and/or target, as appropriate) to register each pattern only once, and to associate the pattern to different keys as needed. In this manner, the same pattern can be used for accessing multiple virtual memory spaces, e.g., multiple different matrices.

In one embodiment, the network device pre-associates between keys and patterns, and in particular, if desired, pre-associates a certain pattern with multiple keys. This technique is referred to herein as "pattern-key pre-association". The network device may later perform re-association, i.e., switch the association of a given key from one pattern to another pattern.

In another embodiment, a network device (initiator and/or target) registers each pattern only once, and then associates a pattern to a key in an ad-hoc manner, per transaction. This technique is referred to herein as "ad-hoc pattern-key association".

In some embodiments, the network device may also specify a start address or an initial offset parameter, to be applied to the pattern in a given transaction. This feature allows using pattern not only for accessing different virtual memory spaces (e.g., different matrices), but also for accessing different offsets within a virtual memory space (e.g., different columns of a matrix).

In yet another embodiment, instead of associating a key and a pattern, a network device (initiator and/or target) includes an explicit, self-contained description of the pattern in the RDMA transaction itself. This technique is referred to herein as "ad-hoc pattern description".

In alternative embodiments, the disclosed techniques are used for transferring data locally (i.e., not over a network) between memories. Any of the pattern description, registration and association techniques described herein, e.g., "pre-association", "ad-hoc association" and "ad-hoc description", can also be used for local data transfer that does not involve network communication. In these embodiments, a DMA device comprises a memory interface and a DMA engine. The memory interface is configured to communicate with a first memory and with a second memory. The DMA engine is configured to (i) receive a request to transfer data between the first memory and the second memory in accordance with a pattern of offsets to be accessed in the first memory or in the second memory, and (ii) transfer the data in accordance with the request. Various system configurations of this sort are described herein.

In yet other embodiments the disclosed techniques are used for transferring data between a memory and a network, but not necessarily between two memories. In these embodiments, the network device at one end of such a transfer may be a conventional network device that does not support the disclosed techniques. Various schemes of memory-network data transfer schemes are described herein, as well.

The different techniques described above ("pre-association", "ad-hoc association" and "ad-hoc description") have different pros and cons, for example with respect to registration overhead, memory footprint, and the need for synchronization between the initiator and target network devices. Generally, all techniques are highly effective in transferring data using RDMA, particularly non-contiguous data. Various examples and use-cases of these techniques are described herein. Nested representations of patterns, and iterative patterns, which can be used with any of the disclosed techniques, are also described and demonstrated.

System Configurations

FIG. 1A is a block diagram that schematically illustrates a communication system 20 that transfers data using patterned RDMA, in accordance with an embodiment of the present invention. System 20 comprises two network devices 24A and 24B that communicate with one another over a network 28. Network device 24A is connected to a memory 36A and to a work requestor 32A via a local bus 40A. Similarly, network device 24B is connected to a memory 36B and to a work requestor 32B via a local bus 40B.

In a given RDMA transaction, either network device 24A or network device 24B can serve as the initiator network device, and the peer network device would serve as the target network device. For ease of reference, network device 24A, memory 36A and work requestor 32A are referred to as "local", and network device 24B, memory 36B and work requestor 32B are referred to as "remote".

In various embodiments, each of work requestors 32A and 32B may comprise, for example, a processor such as a Central Processing Unit (CPU) or Graphics Processing Unit (GPU), a device such as a Field-Programmable Gate Array (FPGA), or any other device capable of requesting data transfer. Each of local buses 40A and 40B may comprise, for example, a Peripheral Component Interconnect express (PCIe) bus, a Compute Express Link (CXL) bus, an Nvlink or Nvlink Chip-to-Chip (Nvlink-C2C) bus, or any other suitable local bus. Each of memories 36A and 36B may comprise, for example, a Random-Access Memory (RAM).

Network devices 24A and 24B are used for transferring data using RDMA between memories 36A and 36B, using methods that are described in detail below. In some embodiments network 28 is an IB network, and network devices 24A and 24B are IB HCAs. In other embodiments network 28 is an network, and network devices 24A and 24B are Ethernet Ethernet NICs. When using an Ethernet network, network devices 24A and 24B typically perform RDMA transactions using the ROCE protocol.

In the present example, each of network devices 24A and 24B comprises a host interface 41 for communicating with the respective memory and work requestor, a network interface 42 for communicating with network 28, and processing circuitry 43 that is configured to carry out the disclosed techniques.

In the example of FIG. 1A, memories 36A and 36B are connected to network devices 24A and 24B using respective local buses 40A and 40B. In alternative embodiments, the disclosed techniques can be used with memories located at any other suitable location. For example, any of memories 36A and 36B may be located internally in the respective network device (24A or 24B). As another example, any of memories 36A and 36B may be located internally in the respective work requestor (32A or 32B).

Figure 1B:
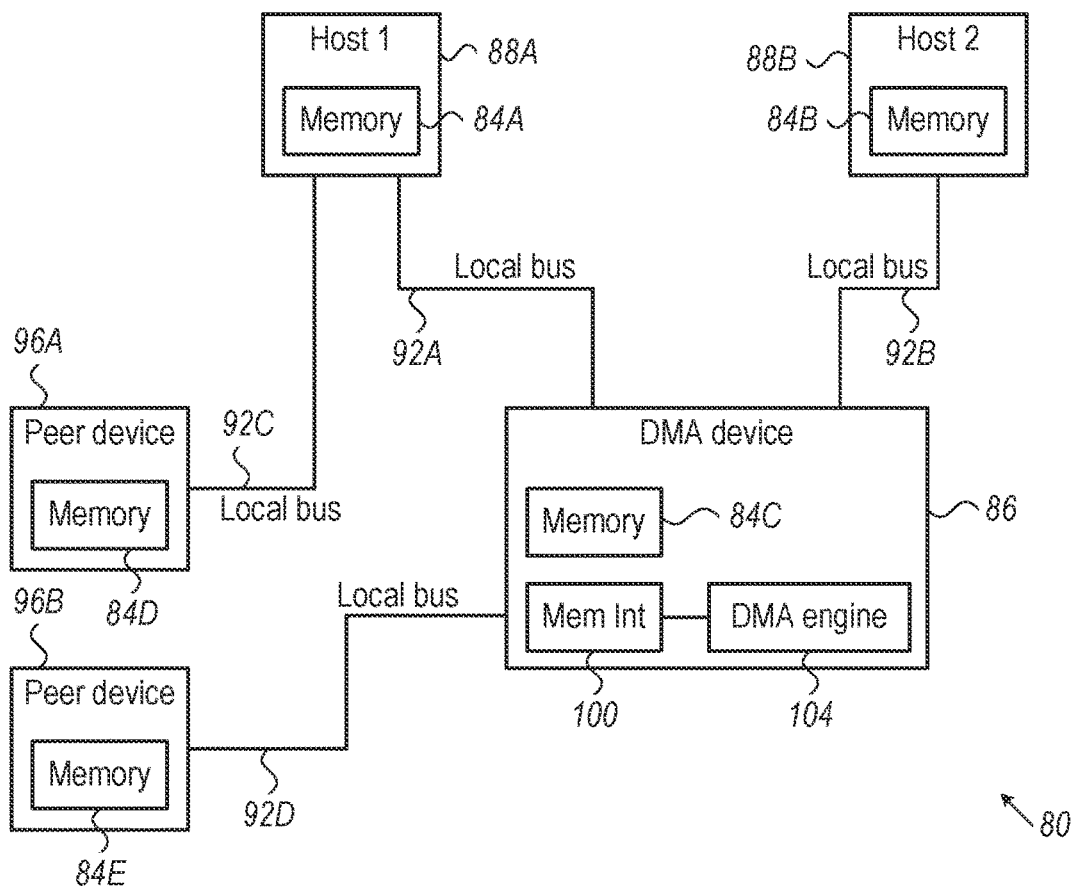
FIG. 1B is a block diagram that schematically illustrates a computing system that uses patterned DMA, in accordance with an embodiment of the present invention.

FIG. 1B is a block diagram that schematically illustrates a computing system 80 that uses patterned DMA, in accordance with an embodiment of the present invention. In the present example, system 80 comprises two hosts 88A and 88B (also denoted Host1 and Host2, respectively) that are connected to a DMA device 86 over respective local buses 92A and 92B.

System 80 further comprises a peer device 96A that is attached directly to host 88A by a local bus 92C, and another peer device 96B that is attached directly to DMA device 86 by a local bus 92D. Peer devices 96A and 96B may comprise, for example, GPUs or FPGAs.

Each of local buses 92A-92D (also referred to as system buses) may comprise, for example, a PCIe bus, a CXL bus, an Nvlink or Nvlink-C2C bus, or any other suitable local bus. A configuration in which a peer device (e.g., device 96B) is attached directly to DMA device 86 is common, for example, when DMA device 86 itself comprises a root complex of the local bus (e.g., PCIe root complex), as in a System-on-Chip (SoC).

In the embodiment of FIG. 1B, system 80 further comprises a plurality of memories 84A-84E, e.g., RAM devices, at various locations. Memories 84A and 84B (referred to as "host memories") are located in hosts 88A and 88B, respectively. Memory 84C is internal to DMA device 86. Memories 84D and 84E (referred to as "peer-device memories") are located in peer devices 96A and 96B, respectively.

DMA device comprises a memory interface 100 and a DMA engine 104. Memory interface 100 is used for communicating with any of memories 84A-84E. DMA engine 104 is configured to transfer (e.g., copy or move) data from any of memories 84A-84E to any of memories 84A-84E using DMA. In example embodiments, data can be transferred between different regions within the same memory. A given memory region may comprise memory segments in multiple memories. In example embodiments, data can be transferred between memories that are not connected to the same local bus.

In various embodiments, DMA engine 104 may use any of the pattern description, registration and association techniques described herein, e.g., "pre-association", "ad-hoc association" and "ad-hoc description", for such local data transfer. Requests for data transfer may originate, for example although not necessarily, from host 88A or 88B.

The description from this point onwards refers mainly to system 20 of FIG. 1A, i.e., to embodiments involving data transfer over a network. This choice is made, however, purely for the sake of clarity. As already stated above, the disclosed techniques can be used in a similar manner in local configurations that do not involve network communication, e.g., as in system 80 of FIG. 1B.

Figure 2:
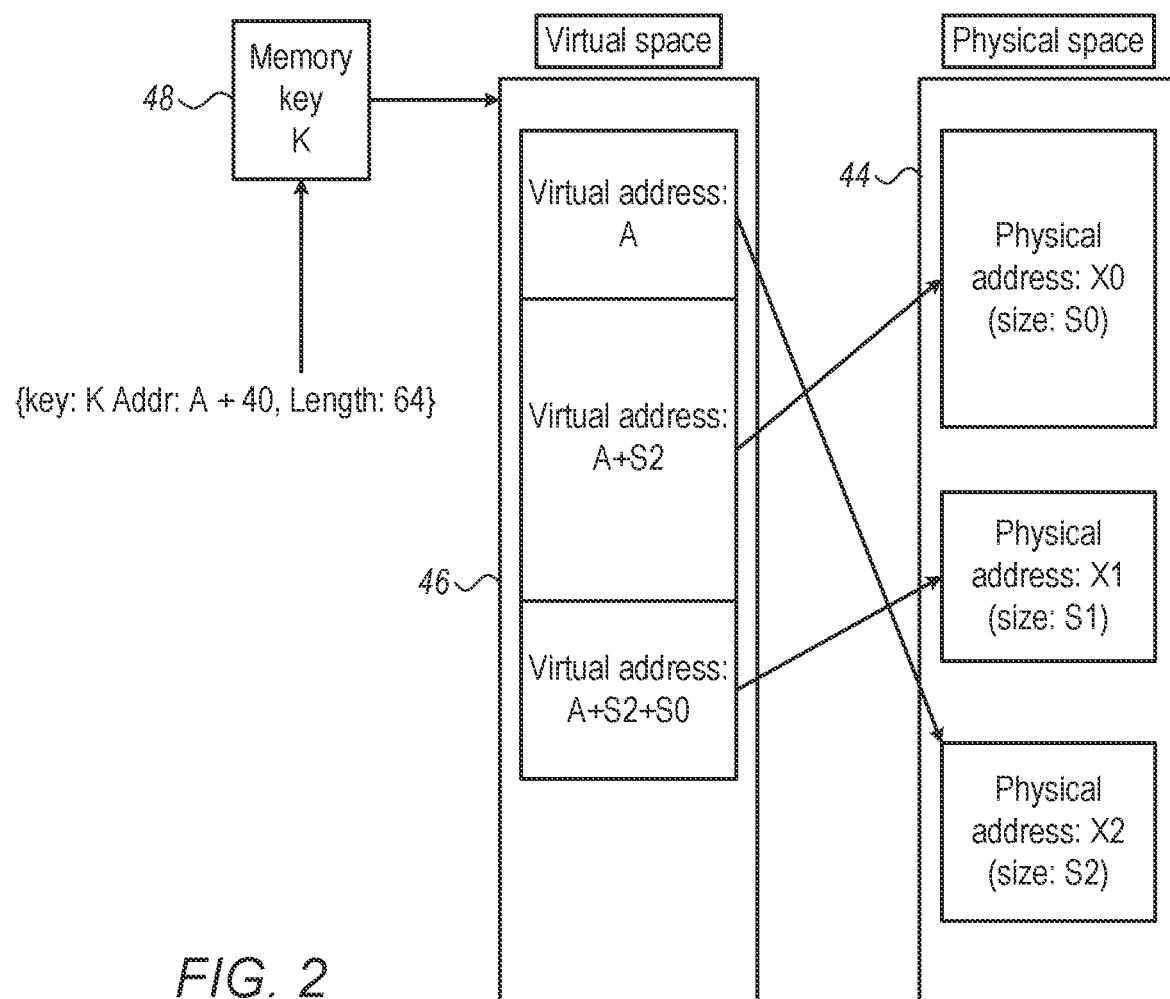
FIG. 2 is a diagram that schematically illustrates memory access using a memory key, in accordance with an embodiment of the present invention.

FIG. 2 is a diagram that schematically illustrates memory access using a memory key, in accordance with an embodiment of the present invention. In the present example, a physical memory space 44 is defined in memory (e.g., memory 36A or 36B of FIG. 1A). Physical memory space 44 comprises multiple physical memory pages having respective physical addresses. Physical memory space 44 may be contiguous or non-contiguous in the memory—in the present example the physical memory space comprises three disjoint memory regions.

Physical memory space 44 is mapped onto a virtual memory space 46 (also referred to as "memory buffer"). Virtual memory space 46 comprises a contiguous range of virtual addresses, which are mapped one-to-one to respective physical addresses in physical memory space 44.

Virtual memory space 46 is represented by a memory key 48 (referred to herein as "key" for brevity). Work requestors 32A and 32B are aware of ("exposed to") the virtual addresses, the virtual memory spaces and the memory keys, and use them for specifying RDMA commands. A work requestor may handle multiple keys at a given time. An access (e.g., read or write) to a virtual memory space typically specifies (i) the memory key of the desired virtual memory space, (ii) a virtual address within the virtual memory space, and (iii) the length of the data to be accessed (read or written).

FIGS. 3A and 3B are diagrams that schematically illustrate examples of memory patterns, in accordance with embodiments of the present invention. These examples demonstrate that, in many practical cases, data needs to be accessed (read or written) as part of an RDMA transaction in accordance with a non-contiguous pattern 52 within a virtual memory space.

In the example of FIG. 3A, pattern 52 is periodic, i.e., specifies a periodic sequence of offsets: Starting from a certain virtual address (e.g., the first virtual address in the virtual memory space in question), two bytes should be accessed, the next fourteen bytes should be skipped, the next two bytes accessed, the next fourteen bytes skipped, and so on. This example may represent, for example, accessing the first column in a matrix in which each column is two-bytes wide. In the example of FIG. 3B, pattern 52 is a-periodic, i.e., specified an a-periodic sequence of offsets within the virtual memory space. The patterns shown in FIGS. 3A and 3B are chosen purely by way of example.

Embodiments described below provide highly efficient techniques for transferring data using RDMA in accordance with such patterns. The patterns are typically specified by the work requestors (e.g., 32A and 32B). A pattern can be specified using any suitable format, e.g., as an explicit list of offsets (e.g., for an a-periodic pattern), as a definition of recurring stride (for a periodic pattern), or in any other way.

Three example techniques are described below, referred to as "pattern-key pre-association", "ad-hoc pattern-key association" and "ad-hoc pattern description". These techniques are especially effective considering that:

In many cases, a given pattern may be relevant to multiple virtual memory spaces (memory buffers). For example, a memory may store multiple matrices of the same dimensions in different virtual memory spaces, and the same pattern could be used for accessing a specified column in any of the matrices.

Additionally or alternatively, the same virtual memory space (memory buffer) may be accessed using multiple different patterns. For example, in some cases an entire matrix needs to be accessed in memory, and in other cases only a specified subset of columns in the same matrix needs to be accessed.

Patterned RDMA with Pre-Association Between Memory Keys and Patterns

The "pattern-key pre-association" technique, illustrated in FIGS. 4-7 below, is characterized by the following:

Before a work requestor (32A or 32B) issues a work request for an RDMA transaction, the pattern and the key to be used in the transaction are pre-registered, and also pre-associated with one another, in one or both of network devices 24A and 24B.

The work request issued by the work requestor specifies the key but not the pattern. Memory access operations typically specify the tuple {key, address, length}.

Typically, an attempt to associate a key with a non-existent pattern, or to perform memory access using a non-existent pattern, will result in transaction failure.

FIG. 4 is a diagram that schematically illustrates pre-registration, pre-association and re-association of memory keys and patterns, in accordance with an embodiment of the present invention.

In the present example, a work requestor (32A or 32B) has instructed the respective network device (24A or 24B) to pre-register three keys 56 (denoted "key0", "key1" and "key2") and three patterns 60 (denoted "pattern0", "pattern1" and "pattern2"). Additionally, the work requestor has initially instructed the network device to pre-associate key0 with pattern0, key1 with pattern0, and key2 with pattern1.

At this stage, the work requestor may issue work requests that specify a key but not a pattern. In response to such a work request, the network devices are able to perform the requested RDMA transaction using (i) specified key and (ii) the pattern that is pre-associated with the specified key.

At some later point in time, as illustrated by an arrow 64, the work requestor instructs the network device to re-associates key2, so that key2 becomes associated with pattern2 instead of pattern1. Subsequent work requests, which specify key2, will initiate RDMA transactions that use key2 and pattern2.

The example above demonstrates that (i) multiple keys can be associated with the same pattern, and that (ii) key-pattern associations can be modified over time. The "pattern-key pre-association" technique minimizes the computational overhead, and also the memory footprint, incurred by registration of keys and patterns.

In another example embodiment, a frontend key is associated with the following:

A pattern (which may comprise nested or iterative patterns as defined below).

A buffer key which defines a virtual or physical memory space.

A base virtual address within the buffer key's memory space.

An access by the network device to the frontend key first stores the buffer key and virtual address. It then calculates the current size and offset (s) within the memory space indicated by the pattern. Once the last level of nested pattern has been reached, the final address calculation is added to the base virtual address and used to access the buffer key. In this example, the pre-association operation is performed on the frontend key, and comprises a {pattern, buffer_key} pair.

The above example also demonstrates that using multiple frontend keys (i) multiple buffer keys can be associated with the same pattern, and that (ii) key-pattern associations can be modified over time. In yet another embodiment, the pattern itself may specify the buffer key and base virtual address. In this embodiment, the pre-association operation is performed on the pattern itself, and association is between the pattern and the key. In this example, only a single buffer key can be associated with a pattern, however, association can still be modified over time.

Figure 5:
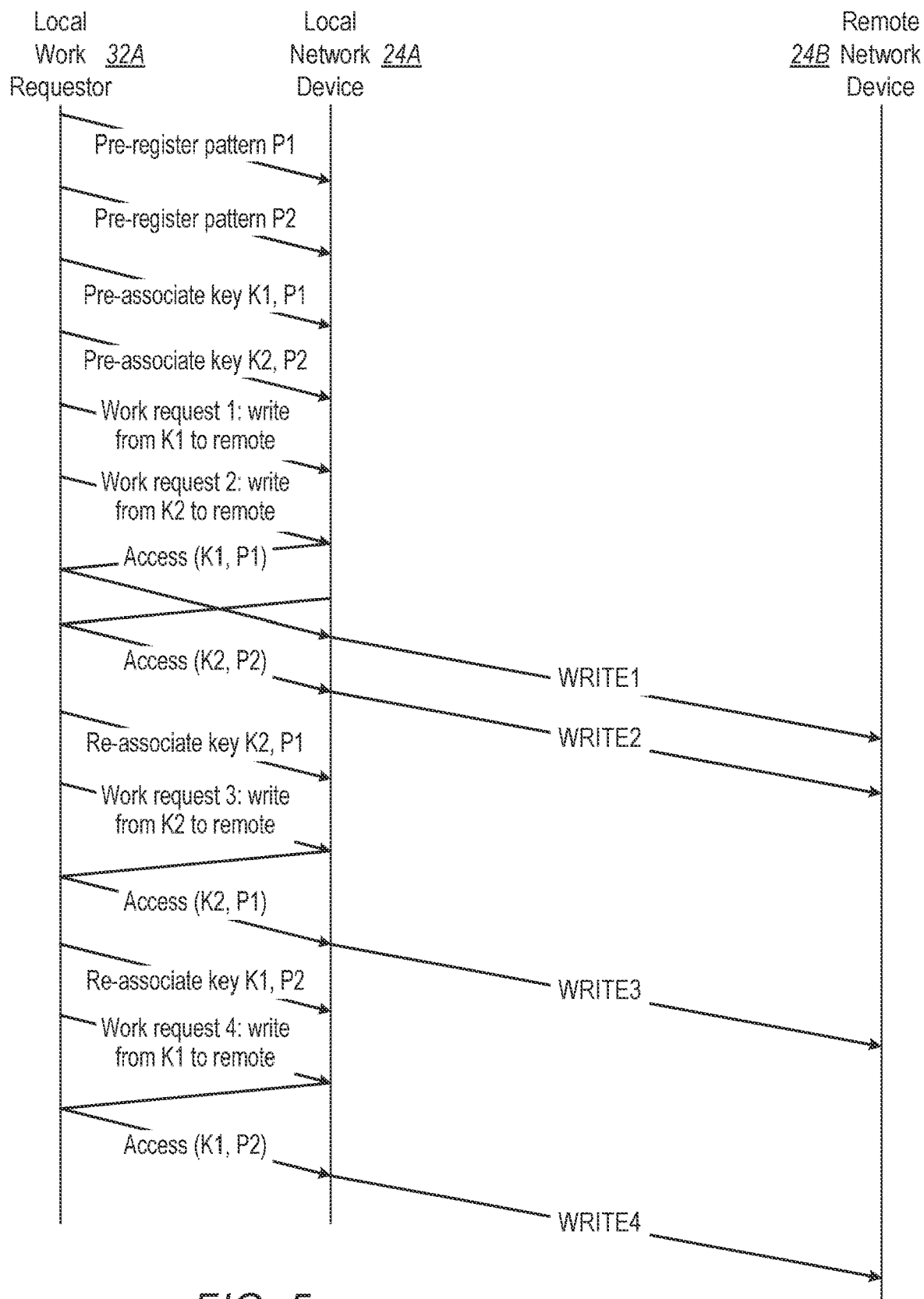
FIGS. 5-7 are message diagrams that schematically illustrate patterned RDMA transactions with pre-association between memory keys and patterns, in accordance with embodiments of the present invention.
Figure 6:
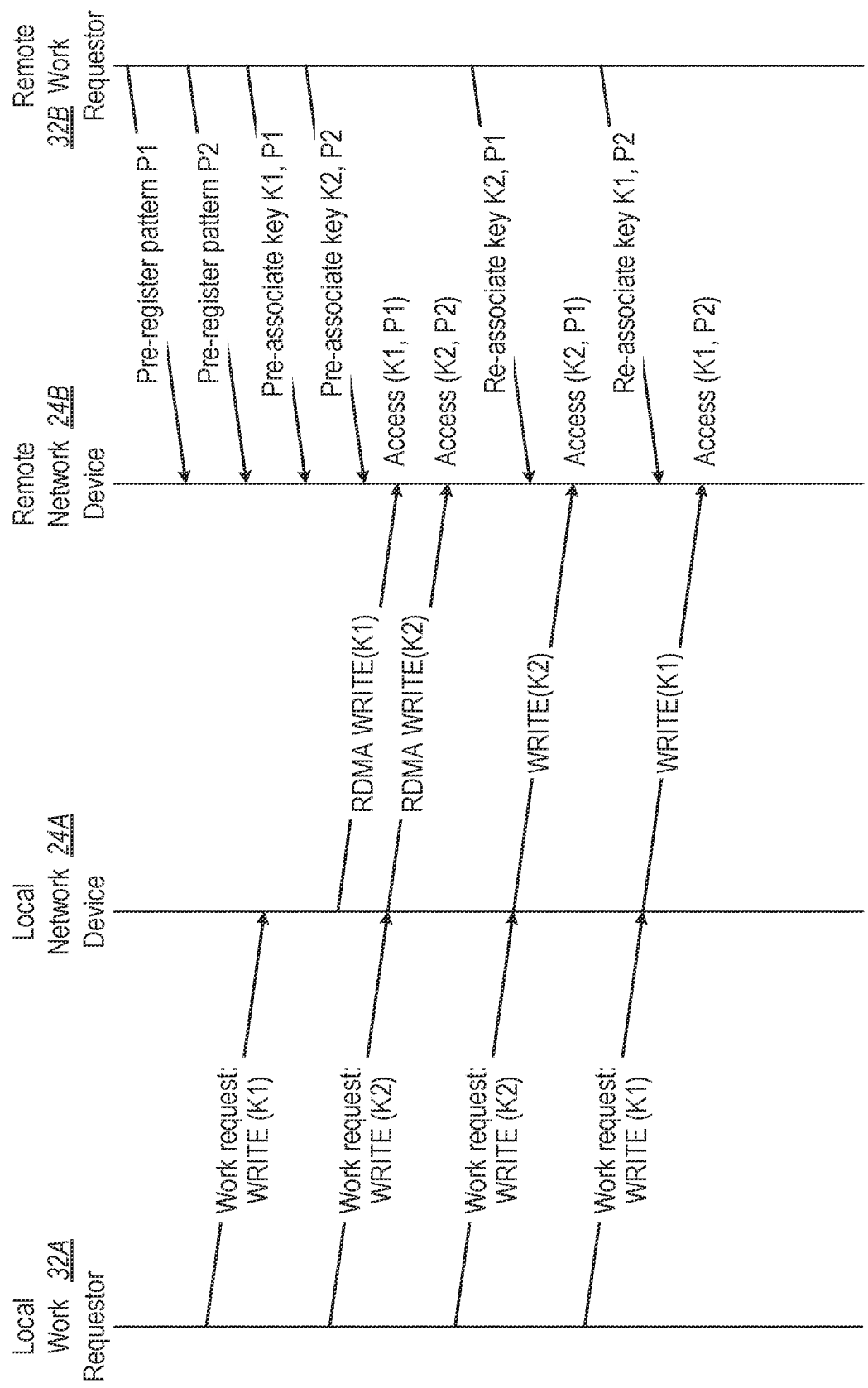
Figure 7:
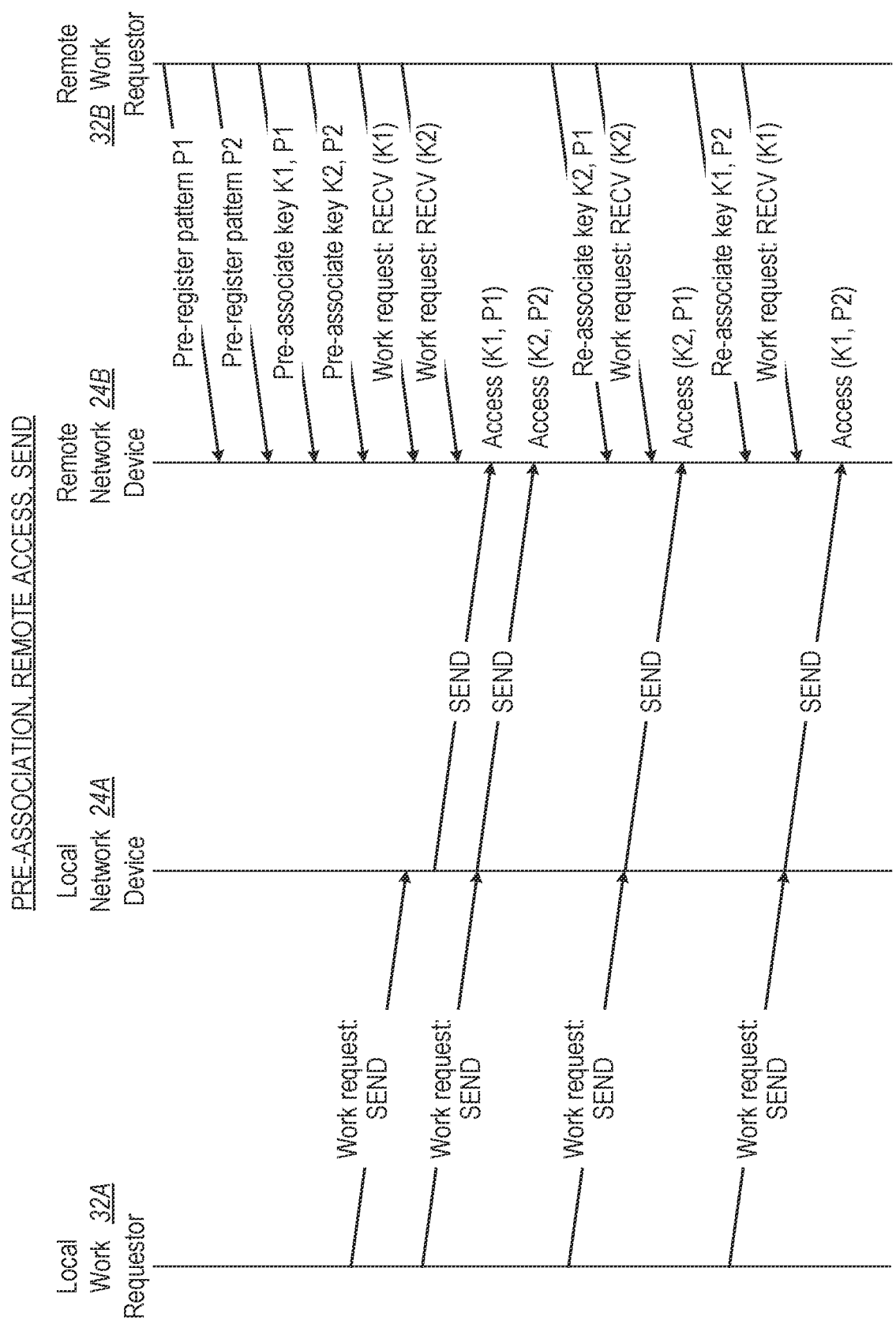

FIGS. 5-7 are message diagrams that schematically illustrate RDMA transactions using the "pattern-key pre-association" technique, in accordance with embodiments of the present invention.

FIG. 5 illustrates an exchange of RDMA WRITE transactions with local patterned access. The exchange comprises the following stages (illustrated by arrows, from top to bottom):

Work requestor 32A instructs network device 24A to pre-register a pattern denoted P1.

Work requestor 32A instructs network device 24A to pre-register an additional pattern, denoted P2.

Work requestor 32A instructs network device 24A to pre-associate pattern P1 with a key denoted K1.

Work requestor 32A instructs network device 24A to pre-associate pattern P2 with a key denoted K2.

Work requestor 32A issues a first work request to network device 24A, requesting an RDMA Write transaction. The transaction is to write data from the virtual memory space represented by key K1 (in local memory 36A) to remote memory 36B.

Work requestor 32A issues a second work request to network device 24A, requesting a second RDMA Write transaction. The second transaction is to write data from the virtual memory space represented by key K2 (in local memory 36A) to remote memory 36B.

In response to the first work request, network device 24A reads the requested data from memory 36A (reads from the virtual memory space represented by K1, using pattern P1). The first work request did not specify P1 explicitly. Instead, network device 24A determines the applicable pattern from the pre-association of K1 and P1.

Having read the data using K1 and P1, network device 24A sends the data in an RDMA WRITE packet (denoted WRITE1 in the figure) to the peer network device 24B.

In response to the second work request, network device 24A reads the requested data from memory 36A (reads from the virtual memory space represented by K2, using pattern P2). Here, too, P2 was not specified in the work request. Instead, network device 24A determines the applicable pattern from the pre-association of K2 and P2.

Having read the data using K2 and P2, network device 24A sends the data in a second RDMA WRITE packet (denoted WRITE2 in the figure) to the peer network device 24B.

At some later point in time, work requestor 32A instructs network device 24A to perform re-association, so that key K2 becomes associated with pattern P1.

Work requestor 32A then issues a third work request to network device 24A, requesting a third RDMA Write transaction. The third transaction is to write data from the virtual memory space represented by key K2 (in local memory 36A) to remote memory 36B.

In response to the third work request, network device 24A reads the requested data from memory 36A (reads from the virtual memory space represented by K2, using pattern P1 as newly re-associated with K2).

Having read the data using K2 and P1, network device 24A sends the data in a third RDMA WRITE packet (denoted WRITE3) to the peer network device 24B.

Work requestor 32A now instructs network device 24A to perform another re-association, so that key K1 becomes associated with pattern P2.

Work requestor 32A then issues a fourth work request to network device 24A, requesting a fourth RDMA Write transaction. The fourth transaction is to write data from the virtual memory space represented by key K1 (in local memory 36A) to remote memory 36B.

In response to the fourth work request, network device 24A reads the requested data from memory 36A (reads from the virtual memory space represented by K1, using pattern P2 as newly re-associated with K1).

Having read the data using K1 and P2, network device 24A sends the data in a fourth RDMA WRITE packet (denoted WRITE4) to the peer network device 24B.

In the example of FIG. 5, patterned access (including pre-registration, pre-association and re-association) is performed in reading the data from the source memory (36A) by the initiator network device (24A). The target network device (24B) is not necessarily aware of the pattern, of the key, or even that the data it receives in the RDMA WRITE packets was obtained using patterned readout. Thus, in this example, the target network device may be a conventional RDMA-capable device that does not support the disclosed techniques.

FIG. 6 illustrates an exchange of RDMA WRITE transactions with remote patterned access. The exchange comprises the following stages:

Work requestor 32B instructs network device 24B to pre-register a pattern denoted P1.

Work requestor 32B instructs network device 24B to pre-register an additional pattern, denoted P2.

Work requestor 32B instructs network device 24B to pre-associate pattern P1 with a key denoted K1.

Work requestor 32B instructs network device 24B to pre-associate pattern P2 with a key denoted K2.

Work requestor 32A issues a first work request to network device 24A, requesting an RDMA Write transaction. The transaction is to write data to the virtual memory space represented by key K1 (in remote memory 36B).

In response to the first work request, network device 24A sends the data in an RDMA WRITE packet to the peer network device 24B. In this embodiment, in contrast to the embodiment of FIG. 5, the RDMA WRITE packet also conveys the key K1 to be used.

Upon receiving the RDMA packet, network device 24B writes the data to the virtual memory space represented by key K1 (in remote memory 36B) using pattern P1 (which has been pre-associated with K1 in network device 24B).

Work requestor 32A issues a second work request to network device 24A, requesting a second RDMA Write transaction. The transaction is to write data to the virtual memory space represented by key K2 (in remote memory 36B).

In response to the second work request, network device 24A sends the data in a second RDMA WRITE packet to the peer network device 24B. The RDMA WRITE packet conveys the key K2 to be used.

Upon receiving the second RDMA packet, network device 24B writes the data to the virtual memory space represented by key K2 (in remote memory 36B) using pattern P2 (which has been pre-associated with K2 in network device 24B).

At some later point in time, work requestor 32B instructs network device 24B to perform re-association, so that key K2 becomes associated with pattern P1.

Work requestor 32A then issues a third work request to network device 24A, requesting a third RDMA Write transaction. The third transaction is to write data to the virtual memory space represented by key K2 (in remote memory 36B).

In response to the third work request, network device 24A sends the data in a third RDMA WRITE packet to the peer network device 24B. The RDMA WRITE packet conveys the key K2 to be used.

Upon receiving the third RDMA packet, network device 24B writes the data to the virtual memory space represented by key K2 (in remote memory 36B) using pattern P1 (which has been re-associated with K2 in network device 24B).

At a later time, work requestor 32B instructs network device 24B to perform re-association, so that key K1 becomes associated with pattern P2.

Work requestor 32A now issues a fourth work request to network device 24A, requesting a fourth RDMA Write transaction. The fourth transaction is to write data to the virtual memory space represented by key K1 (in remote memory 36B).

In response to the fourth work request, network device 24A sends the data in a fourth RDMA WRITE packet to the peer network device 24B. The RDMA WRITE packet conveys the key K1 to be used.

Upon receiving the fourth RDMA packet, network device 24B writes the data to the virtual memory space represented by key K1 (in remote memory 36B) using pattern P2 (which has been re-associated with K1 in network device 24B).

In the example of FIG. 6, patterned access (including pre-registration, pre-association and re-association) is performed in writing the data to the target memory (36B) by the target network device (24B). The initiator network device (24A) is not necessarily aware of the pattern, or even that the data it sends in the RDMA WRITE packets will be stored using patterned readout.

FIG. 7 illustrates an exchange of ROMA SEND transactions with remote patterned access. The exchange comprises the following stages:

Work requestor 32B instructs network device 24B to pre-register a pattern denoted P1.

Work requestor 32B instructs network device 24B to pre-register an additional pattern, denoted P2.

Work requestor 32B instructs network device 24B to pre-associate pattern P1 with a key denoted K1.

Work requestor 32B instructs network device 24B to pre-associate pattern P2 with a key denoted K2.

Work requestor 32B issues a RECEIVE work request, requesting network device 24B to prepare for a SEND command that will arrive over network 28. The RECEIVE work request specifies the key K1 to be used in serving the anticipated SEND command.

Work requestor 32B issues a second RECEIVE work request, requesting network device 24B to prepare for a second SEND command that will arrive over network 28. The second RECEIVE work request specifies the key K2 to be used in serving the anticipated second SEND command.

Work requestor 32A issues a first SEND work request, requesting network device 24A to initiate an RDMA SEND transaction for sending data for storage in memory 36B.

In response to the first SEND work request, network device 24A sends the data in a first RDMA SEND packet to the peer network device 24B.

Work requestor 32A issues a second SEND work request, requesting network device 24A to initiate a second RDMA SEND transaction for sending data for storage in memory 36B.

In response to the second SEND work request, network device 24A sends the data in a second RDMA SEND packet to the peer network device 24B.

Upon receiving the first RDMA SEND packet, network device 24B writes the data to the virtual memory space represented by key K1 (in remote memory 36B) using pattern P1 (which has been pre-associated with K1 in network device 24B).

Upon receiving the second RDMA SEND packet, network device 24B writes the data to the virtual memory space represented by key K2 (in remote memory 36B) using pattern P2 (which has been pre-associated with K2 in network device 24B).

At some point in time, work requestor 32B instructs network device 24B to perform re-association, so that key K2 becomes associated with pattern P1.

Work requestor 32B issues a third RECEIVE work request, requesting network device 24B to prepare for a third SEND command that will arrive over network 28. The third RECEIVE work request specifies the key K2 to be used in serving the anticipated third SEND command.

Work requestor 32A issues a third SEND work request, requesting network device 24A to initiate a third RDMA SEND transaction for sending data for storage in memory 36B.

In response to the third SEND work request, network device 24A sends the data in a third RDMA SEND packet to the peer network device 24B.

Upon receiving the third RDMA SEND packet, network device 24B writes the data to the virtual memory space represented by key K2 (in remote memory 36B) using pattern P1 (which has been pre-associated with K2 in network device 24B).

Then, work requestor 32B instructs network device 24B to perform re-association, so that key K1 becomes associated with pattern P2.

Work requestor 32B issues a fourth RECEIVE work request, requesting network device 24B to prepare for a fourth SEND command that will arrive over network 28. The fourth RECEIVE work request specifies the key K1 to be used in serving the anticipated fourth SEND command.

Work requestor 32A issues a fourth SEND work request, requesting network device 24A to initiate a fourth RDMA SEND transaction for sending data for storage in memory 36B.

In response to the fourth SEND work request, network device 24A sends the data in a fourth RDMA SEND packet to the peer network device 24B.

Upon receiving the fourth RDMA SEND packet, network device 24B writes the data to the virtual memory space represented by key K1 (in remote memory 36B) using pattern P2 (which has been pre-associated with K1 in network device 24B).

In the example of FIG. 7, patterned access (including pre-registration, pre-association and re-association) is performed in writing the data to the target memory (36B) by the target network device (24B). The initiator network device (24A) is not necessarily aware of the pattern, or even that the data it sends in the RDMA SEND packets will be stored using patterned readout. Thus, in this example, the initiator network device may be a conventional RDMA-capable device that does not support the disclosed techniques.

The message flows and message formats depicted in FIGS. 5-7 are example flows that are chosen purely for the sake of conceptual clarity. In alternative embodiments, any other flows and formats can be used.

For example, the above flows typically assume that the pattern should be applied from the beginning of the virtual memory space represented by the key. For example, the pattern of FIG. 3A will always access the first column of a matrix. In alternative embodiments, the key or the pattern can be configured to apply the pattern from the start virtual address of the RDMA transaction (regardless of the start virtual address of the virtual memory space represented by the key). This technique enables using a single {key, pattern} pair to access any matrix column. As another example, the work request and/or the RDMA packet may be configured to convey an initial offset parameter, which specifies an initial displacement (from the beginning of the virtual memory space) at which the pattern should be applied.

Patterned RDMA with AD-HOC Association Between Memory Keys and Patterns

The "pattern-key pre-association" technique described above is highly effective, but in some scenarios requires a certain degree of coordination between the local and remote work requestors as to the keys and patterns used for remote memory access. The "ad-hoc pattern-key association" technique, illustrated in FIGS. 8-11 below, eliminates this requirement, and also the need for re-association.

When using ad-hoc pattern-key association, the work requestor registers one or more patterns in the respective network device, using suitable pattern descriptions. In response to a registration of a given pattern, the work requestor receives a pattern identifier for use in subsequent RDMA transactions using this pattern. Any pattern can be used with any key, per transaction. There is no pre-association between patterns and keys, and therefore no need for re-association. Moreover, when using ad-hoc pattern-key association, multiple simultaneous transactions can use the same key with different patterns.

The "pattern-key pre-association" technique is thus characterized by the following:

Before a work requestor (32A or 32B) issues a work request for an RDMA transaction, the pattern and the key to be used in the transaction are pre-registered in one or both of network devices 24A and 24B, but not pre-associated with one another.

The work request issued by the work requestor specifies the key and the identifier of the pattern. Memory access operations typically specify the tuple {key, pattern_id, address, length}.

Typically, an attempt to perform memory access using a non-existent pattern, will result in transaction failure. For remote operations the failure could result in a non-acknowledged response (NAK), such as a Remote Access Error (RAE) NAK.

Figure 8:
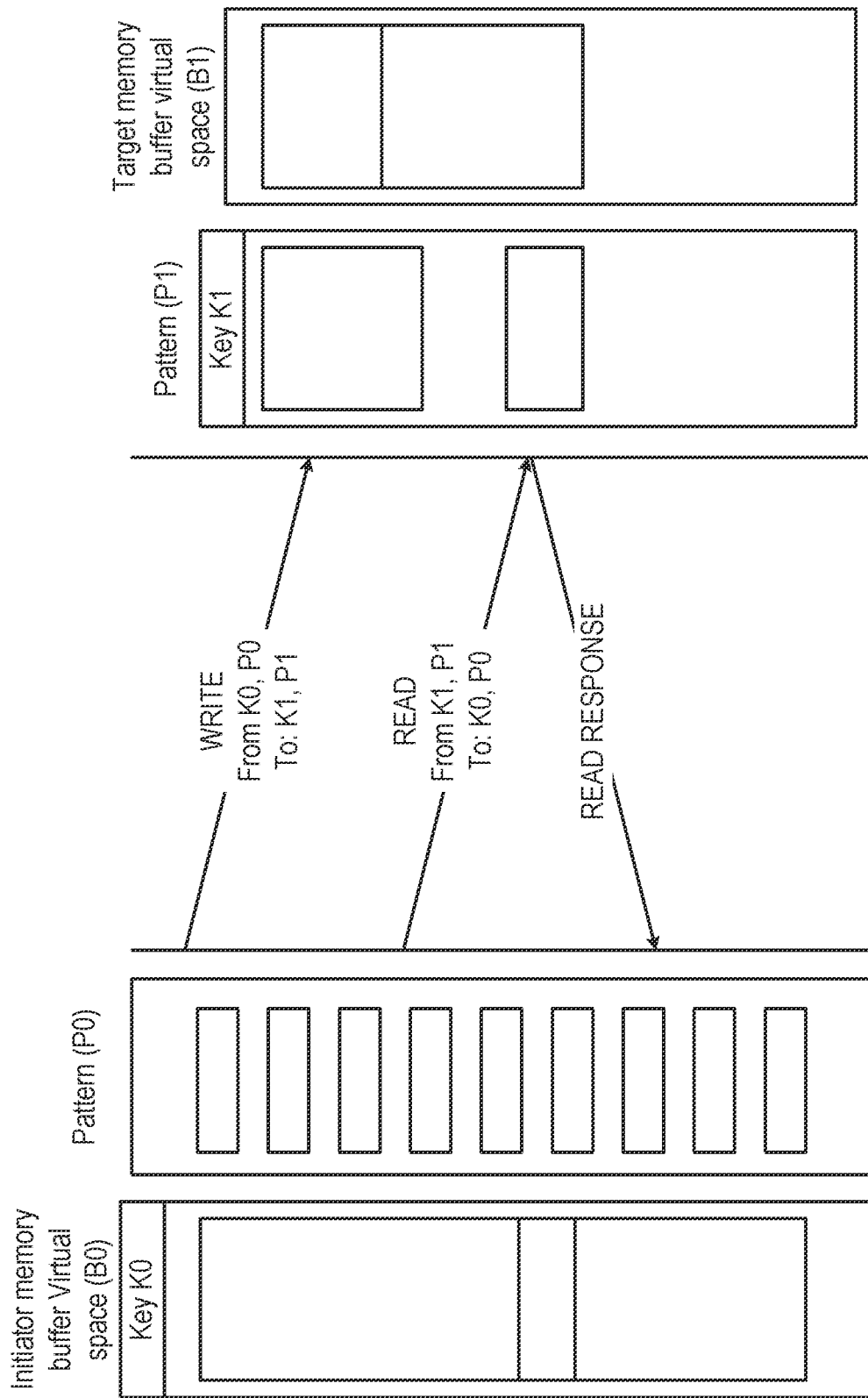
FIG. 8 is a diagram that schematically illustrates patterned RDMA transactions with ad-hoc association between memory keys and patterns, in accordance with an embodiment of the present invention.

FIG. 8 is a diagram that schematically illustrates patterned RDMA transactions with ad-hoc association between memory keys and patterns, in accordance with an embodiment of the present invention. In the present example, the initiator's virtual memory space is denoted B0, and the target's virtual memory space is denoted B1. A key denoted K0 and a pattern having a pattern_id P0 are defined in the initiator's virtual memory space B0. A key denoted K1 and a pattern having a pattern_id P1 are defined in the target's virtual memory space B1.

The initiator may use these patterns and keys for various types of RDMA transactions, e.g., Read or Write, for patterned access in the local memory and/or in the remote memory. As a special case, one of the patterns may be defined as "contiguous", in which case patterned access is performed only on one side (i.e., only in the local memory, or only in the remote memory).

The figure shows two example RDMA transactions:

A Write transaction that reads data from the local memory using {K0, P0} and writes the data to the remote memory using {K1, P1}.

A Read transaction that reads data from the remote memory using {K1, P1} and writes the data to the local memory using {K0, P0}.

Figure 9:
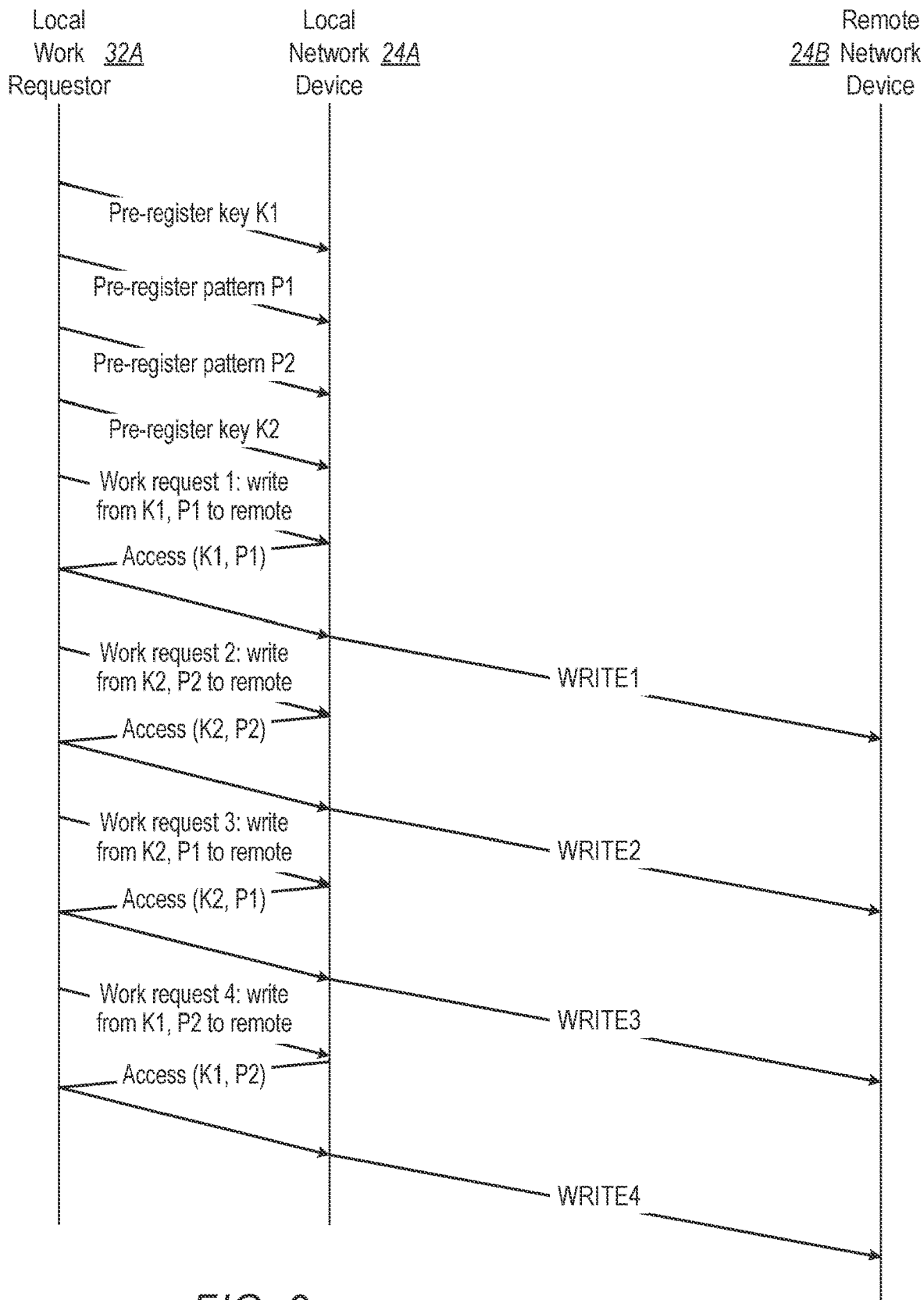
FIGS. 9-11 are message diagrams that schematically illustrate patterned RDMA transactions with ad-hoc association between memory keys and patterns, in accordance with embodiments of the present invention.
Figure 10:
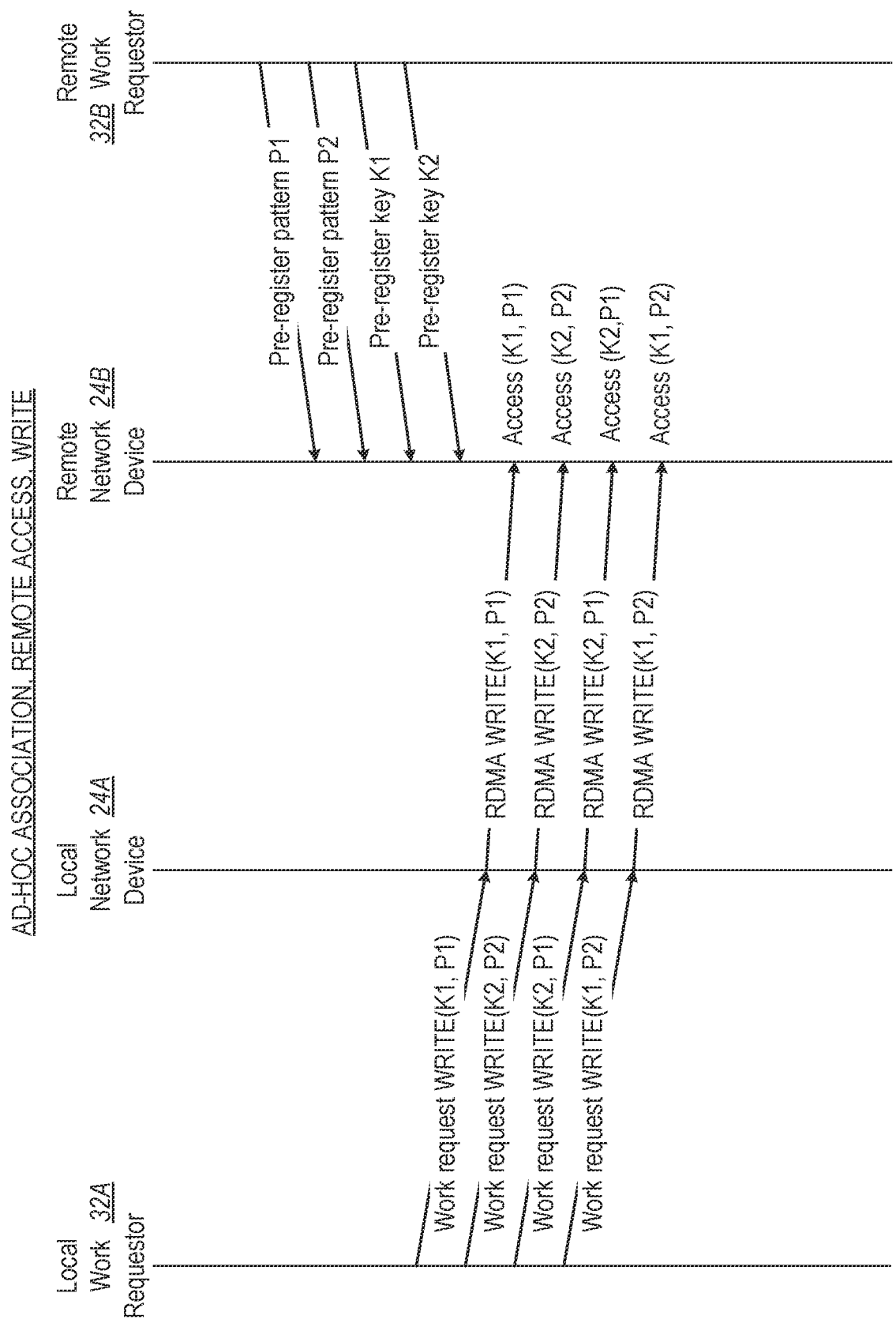
Figure 11:
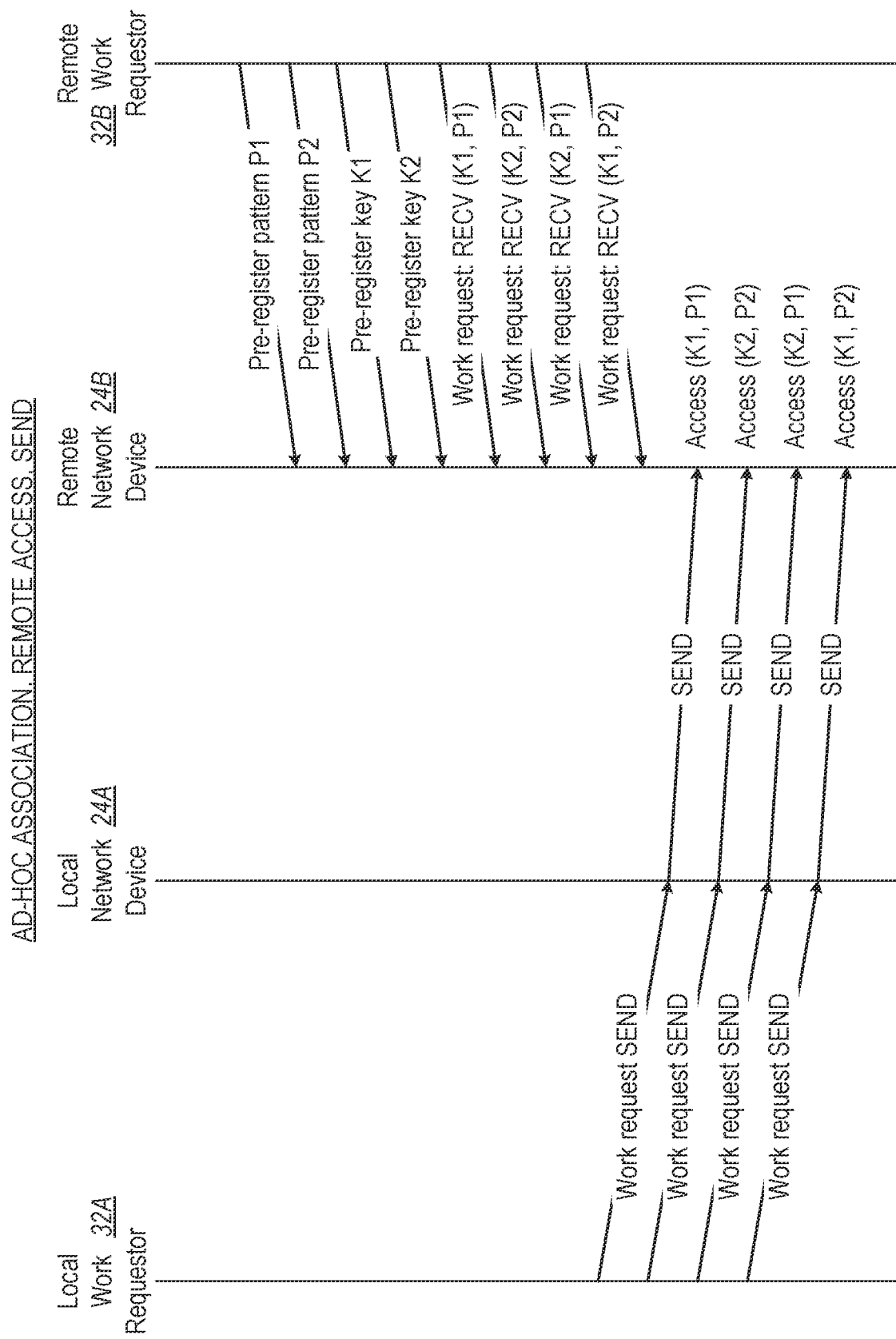

FIGS. 9-11 are message diagrams that schematically illustrate patterned RDMA transactions with ad-hoc association between memory keys and patterns, in accordance with embodiments of the present invention.

FIG. 9 illustrates an exchange of RDMA WRITE transactions with local patterned access. The exchange comprises the following stages (illustrated by arrows, from top to bottom):

Work requestor 32A instructs network device 24A to pre-register (i) a key denoted K1, (ii) a pattern denoted P1, (iii) a pattern denoted P2, and (iv) a key denoted K2.

Work requestor 32A issues a first work request to network device 24A, requesting an RDMA Write transaction. The transaction is to read data from the virtual memory space represented by key K1 (in local memory 36A) using pattern P1, and then write the data to remote memory 36B. Note that, since no pre-association between keys and patterns have been performed, the first work request specifies both the key and the pattern.

In response to the first work request, network device 24A reads the requested data from memory 36A (reads from the virtual memory space represented by K1, using pattern P1). Having read the data using K1 and P1, network device 24A sends the data in an RDMA WRITE packet (denoted WRITE1 in the figure) to the peer network device 24B.

Network device 24A repeats the above process, initiating three additional RDMA Write transactions—(i) a transaction denoted WRITE2 using {K2, P2}, (ii) transaction denoted WRITE3 using {K2, P1}, and (iii) a transaction denoted WRITE4 using {K1, P2}.

In the example of FIG. 9, patterned access (including ad-hoc association) is performed in reading the data from the source memory (36A) by the initiator network device (24A). The target network device (24B) is not necessarily aware of the pattern, of the key, or even that the data it receives in the RDMA WRITE packets was obtained using patterned readout. Thus, in this example, the target network device may be a conventional RDMA-capable device that does not support the disclosed techniques.

FIG. 10 illustrates an exchange of RDMA WRITE transactions with remote patterned access. The exchange comprises the following stages:

Work requestor 32B instructs network device 24B to pre-register (i) a pattern denoted P1, (ii) a pattern denoted P2, (iii) a key denoted K1, and (iv) a key denoted K2.

Work requestor 32A issues a first work request to network device 24A, requesting an RDMA Write transaction. The transaction is to write data to the virtual memory space represented by key K1 (in remote memory 36B) using pattern P1.

In response to the first work request, network device 24A sends the data in an RDMA WRITE packet to the peer network device 24B. The RDMA WRITE packet conveys both the key and the pattern identifier.

Upon receiving the RDMA packet, network device 24B writes the data to the virtual memory space represented by key K1 (in remote memory 36B) using pattern P1 (as specified ad-hoc in the RDMA packet).

Network devices 24A and 24B repeat the above process, performing three additional RDMA Write transactions—(i) a transaction using {K2, P2}, (ii) a transaction denoted WRITE3 using {K2, P1}, and (iii) a transaction denoted WRITE4 using {K1, P2}.

FIG. 11 illustrates an exchange of RDMA SEND transactions with remote patterned access. The exchange comprises the following stages:

Work requestor 32B instructs network device 24B to pre-register (i) a pattern denoted P1, (ii) a pattern denoted P2, (iii) a key denoted K1, and (iv) a key denoted K2.

Work requestor 32B issues four RECEIVE work requests, requesting network device 24B to prepare for four respective SEND commands that will arrive over network 28. The RECEIVE work requests specify the ad-hoc key-pattern associations to be used in serving the anticipated SEND commands. In the present example, the four RECEIVE work requests specify {K1, P1}, {K2, P2}, {K2, P1} and {K1, P2}.

Work requestor 32A issues four SEND work requests, requesting network 24A device to initiate four respective RDMA SEND transactions for sending data for storage in memory 36B. In response to the four SEND work requests, network device 24A sends the data in four respective RDMA SEND packets to the peer network device 24B.

Upon receiving each RDMA SEND packet, network device 24B writes the data in remote memory 36B, to the virtual memory space represented by the appropriate key and pattern, as specified by the corresponding RECEIVE work request. This process is repeated four times, using {K1, P1}, {K2, P2}, {K2, P1} and {K1, P2}.

In the example of FIG. 11, patterned access (including ad-hoc association) is performed in writing the data to the target memory (36B) by the target network device (24B). The initiator network device (24A) is not necessarily aware of the pattern, or even that the data it sends in the RDMA SEND packets will be stored using patterned readout. Thus, in this example, the initiator network device may be a conventional RDMA-capable device that does not support the disclosed techniques.

The message flows and message formats depicted in FIGS. 8-11 are example flows that are chosen purely for the sake of conceptual clarity. In alternative embodiments, any other flows and formats can be used. For example, the techniques relating to specifying different initial offsets or start addresses for the pattern, can be used with ad-hoc association, as well.

Patterned RDMA with AD-HOC Pattern Definition

In the "ad-hoc pattern definition" technique, an explicit, self-contained description of the pattern is included in the transaction, e.g., in the work requests and/or in the RDMA packet. The terms "explicit description" and "self-contained description" mean that the parameters of the pattern can be extracted in full from the description alone, without a need for prior coordination between the initiator and target. When using this technique, no pre-registration of memory patterns is required, and no synchronization regarding patterns is required between the initiator and target work requestors. These benefits are particularly evident for non-recurring (or rarely occurring) patterns.

The "ad-hoc pattern definition" technique, illustrated in FIGS. 12-15, is thus characterized by the following:

Before a work requestor (32A or 32B) issues a work request for an RDMA transaction, the key to be used in the transaction is pre-registered in one or both of network devices 24A and 24B.

The work request issued by the work requestor an explicit description of the pattern. Memory access operations typically specify the tuple {key, pattern_description, address, length}.

Typically, an error in the pattern description, or a mismatch between the pattern description and the size of the memory being accessed, will result in transaction failure. For remote operations the failure could result in a non-acknowledged response (NAK), such as a Remote Access Error (RAE) NAK.

Figure 12:
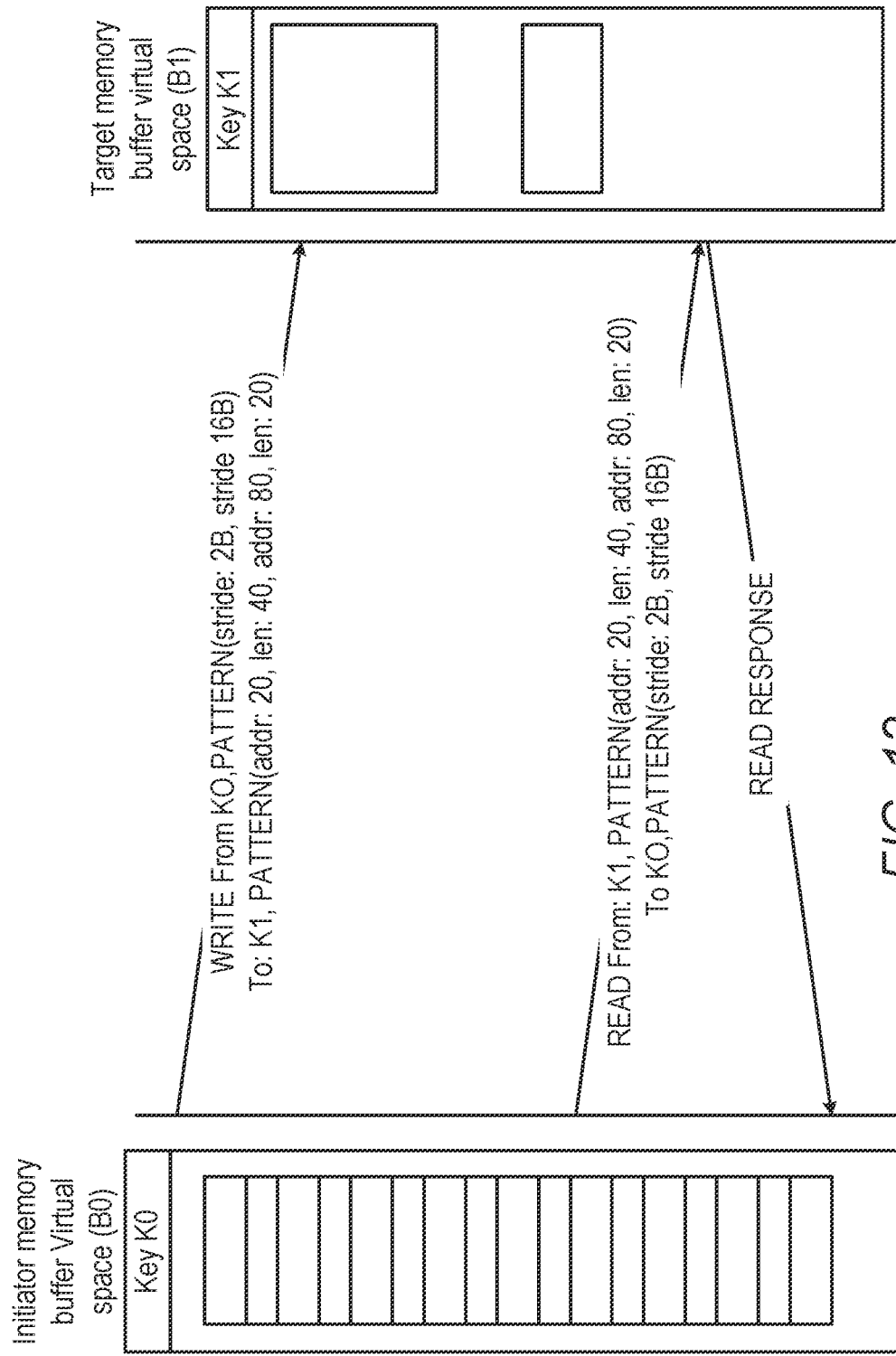
FIG. 12 is a diagram that schematically illustrates patterned RDMA transactions with ad-hoc pattern definition, in accordance with an embodiment of the present invention.

FIG. 12 is a diagram that schematically illustrates patterned RDMA transactions with ad-hoc pattern definition, in accordance with an embodiment of the present invention. In the present example, the initiator's virtual memory space is denoted B0, and the target's virtual memory space is denoted B1. A key denoted K0 is defined in the initiator's virtual memory space B0, and a key denoted K1 is defined in the target's virtual memory space B1.

The initiator may use keys K0 and K1 for various types of RDMA transactions, e.g., Read or Write, for patterned access in the local memory and/or in the remote memory. The figure shows two example RDMA transactions:

A Write transaction that reads data from the local memory using K0 and a periodic, strided pattern, and writes the data to the remote memory using K1 and another, a-periodic pattern.

A Read transaction that reads data from the remote memory using K1 and an a-periodic pattern, and writes the data to the local memory using K0 and a periodic, strided pattern.

In the present context, the term "strided pattern" refers to a periodic pattern that specifies multiple repetitions of {a first data size to be accessed and a second data size to be skipped}.

Figure 13:
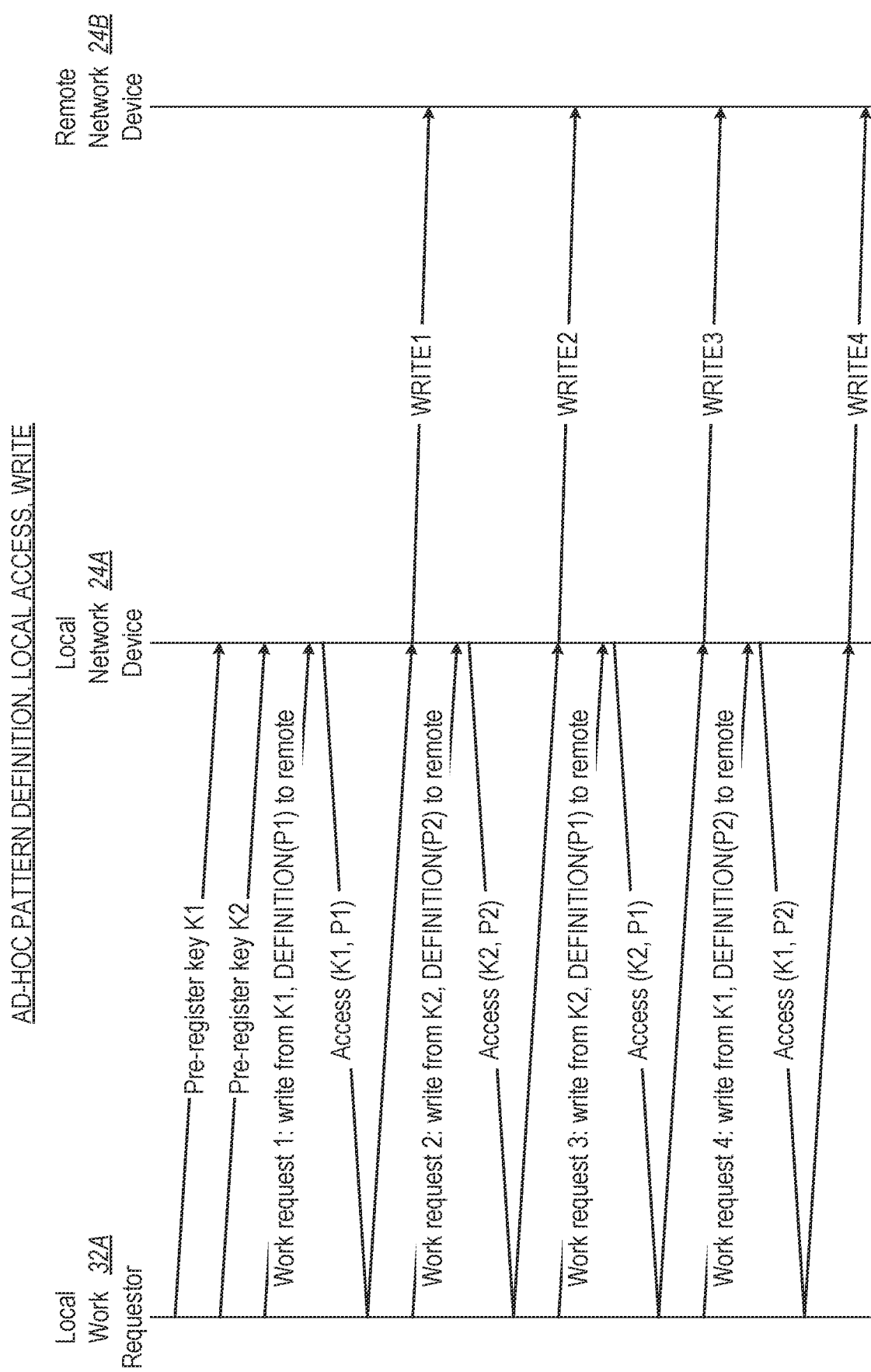
FIGS. 13-15 are message diagrams that schematically illustrate patterned RDMA transactions with ad-hoc pattern definition, in accordance with embodiments of the present invention.
Figure 14:
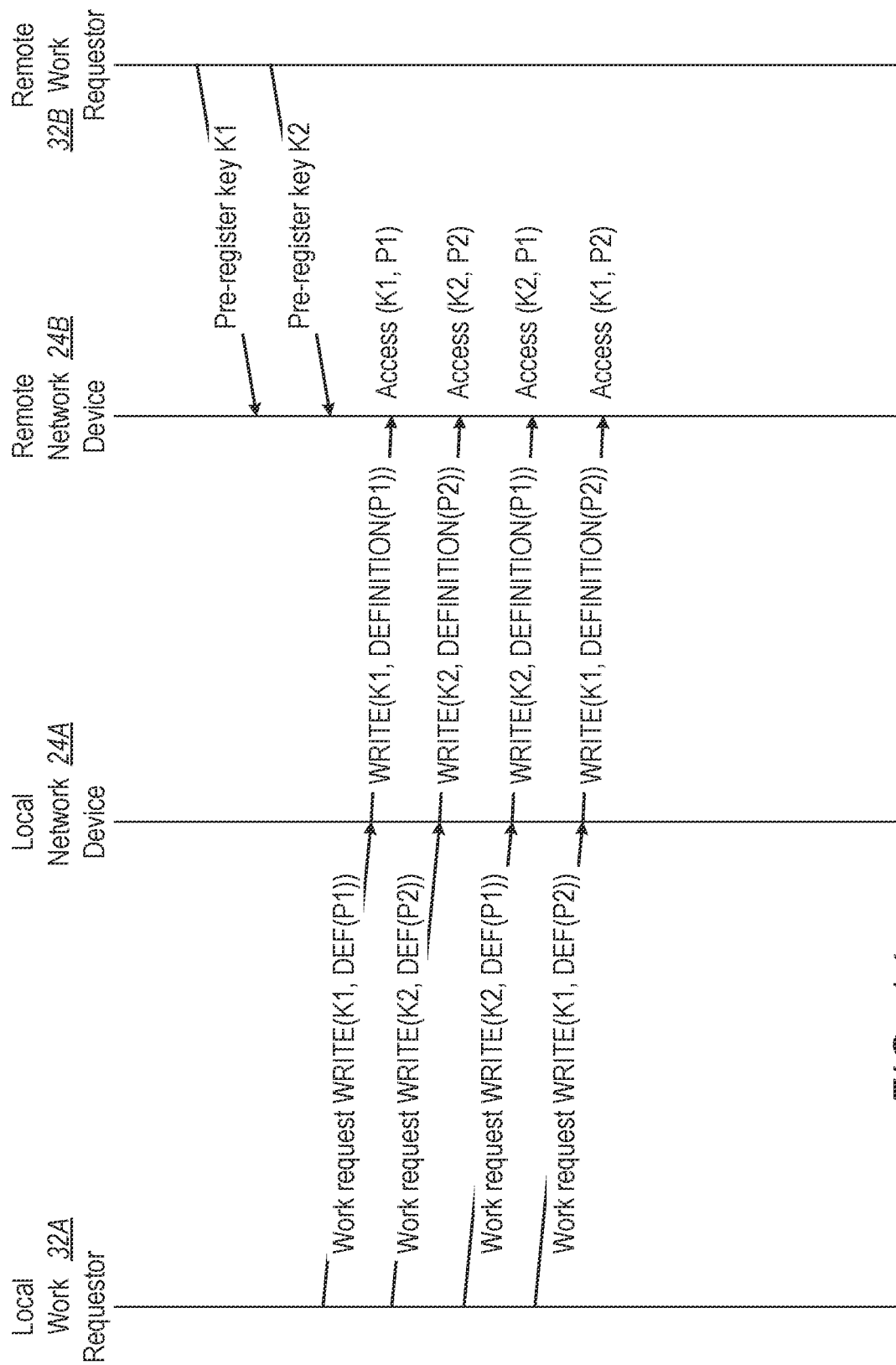
Figure 15:
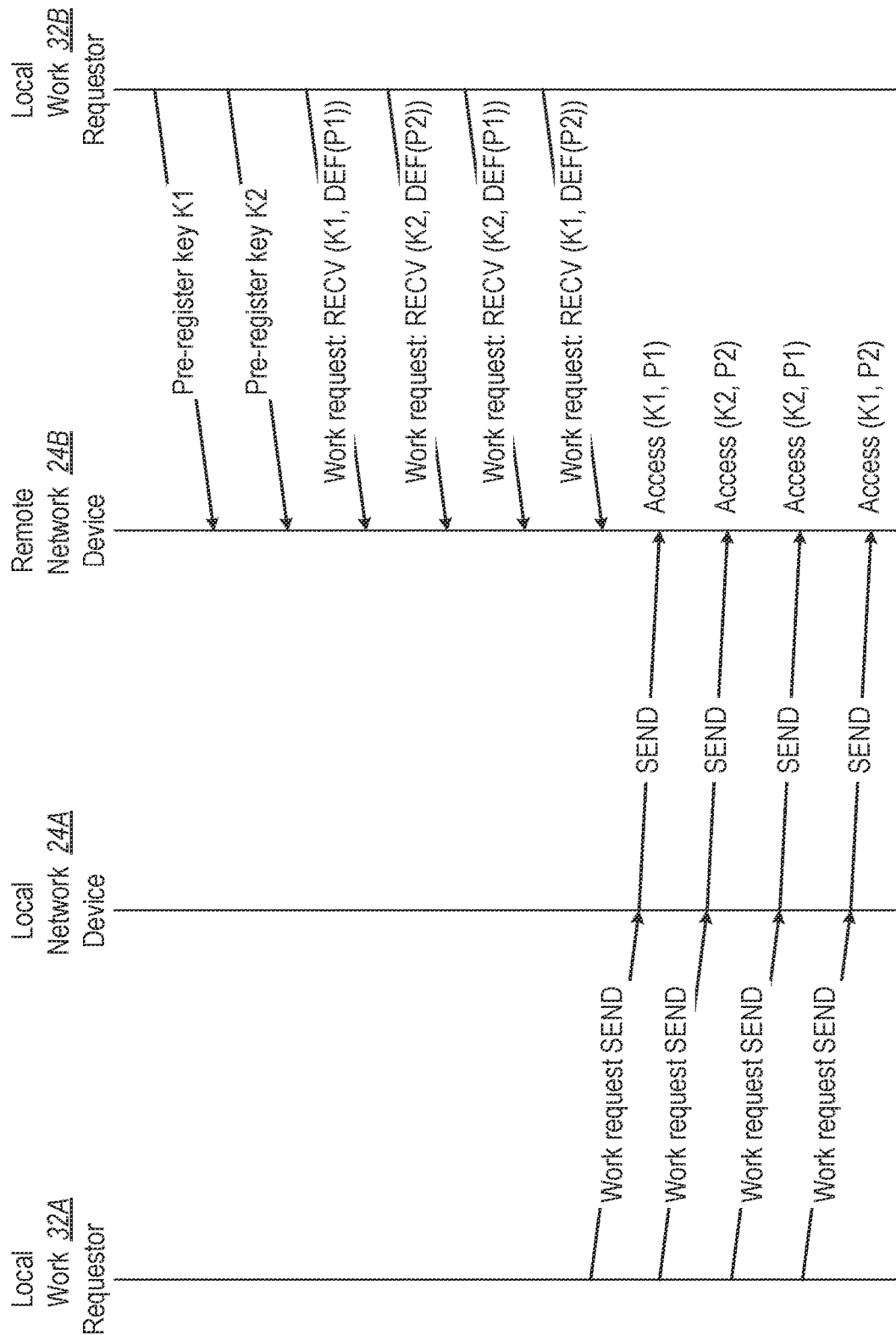

FIGS. 13-15 are message diagrams that schematically illustrate patterned RDMA transactions with ad-hoc pattern definition, in accordance with embodiments of the present invention.

FIG. 13 illustrates an exchange of RDMA WRITE transactions with local patterned access. The transaction exchange comprises the following stages:

Work requestor 32A instructs network device 24A to pre-register two keys, denoted K1 and K2.

Work requestor 32A issues a first work request to network device 24A, requesting an RDMA Write transaction. The transaction is to read data from the virtual memory space represented by key K1 (in local memory 36A) using a pattern P1 whose definition is specified explicitly in the work request. The data is to be written to remote memory 36B.

In response to the first work request, network device 24A reads the requested data from memory 36A (reads from the virtual memory space represented by K1, using pattern P1). Having read the data using K1 and P1, network device 24A sends the data in an RDMA WRITE packet (denoted WRITE1 in the figure) to the peer network device 24B.

Network device 24A repeats the above process, initiating three additional RDMA Write transactions—(i) a transaction denoted WRITE2 using {K2, P2}, (ii) a transaction denoted WRITE3 using {K2, P1}, and (iii) a transaction denoted WRITE4 using {K1, P2}. In each transaction, the definition of the applicable pattern is specified explicitly in the work request.

In the example of FIG. 13, patterned access is performed in reading the data from the source memory (36A) by the initiator network device (24A). The target network device (24B) is not necessarily aware of the pattern, of the key, or even that the data it receives in the RDMA WRITE packets was obtained using patterned readout. Thus, in this example, the target network device may be a conventional RDMA-capable device that does not support the disclosed techniques.

Note also that, by way of example, the four work requests are illustrated as performed serially. In alternative embodiments, the work requests can be pipelined or interleaved as desired, e.g., by issuing four consecutive work requests and then serving them. A subsequent memory access can begin before the previous memory access is completed.

FIG. 14 illustrates an exchange of RDMA WRITE transactions with remote patterned access. The exchange comprises the following stages:

Work requestor 32B instructs network device 24B to pre-register two keys denoted K1 and K2.

Work requestor 32A issues a first work request to network device 24A, requesting an RDMA Write transaction. The transaction is to write data to the virtual memory space represented by key K1 (in remote memory 36B) using a pattern P1 whose definition is given explicitly in the work request.

In response to the first work request, network device 24A sends the data in an RDMA WRITE packet to the peer network device 24B. The RDMA WRITE packet conveys both the key and the explicit definition of the pattern.

Upon receiving the RDMA packet, network device 24B writes the data to the virtual memory space represented by key K1 (in remote memory 36B) using pattern P1 (as specified explicitly in the RDMA packet).

Network devices 24A and 24B repeat the above process, performing three additional RDMA Write transactions—(i) a transaction using {K2, P2}, (ii) a transaction denoted WRITE3 using {K2, P1}, and (iii) a transaction denoted WRITE4 using {K1, P2}. In each transaction, the definition of the applicable pattern is specified explicitly in the work request.

FIG. 15 illustrates an exchange of RDMA SEND transactions with remote patterned access. The exchange comprises the following stages:

Work requestor 32B instructs network device 24B to pre-register two key denoted K1 and K2.

Work requestor 32B issues four RECEIVE work requests, requesting network device 24B to prepare for four respective SEND commands that will arrive over network 28. Each RECEIVE work request includes an explicit definition of the pattern to be used in serving the corresponding SEND command. In the present example, the four RECEIVE work requests specify {K1, DEF (P1)}, {K2, DEF (P2)}, {K2, DEF (P1)} and {K1, DEF (P2)}.

Work requestor 32A issues four SEND work requests, requesting network device 24A to initiate four respective RDMA SEND transactions for sending data for storage in memory 36B. In response to the four SEND work requests, network device 24A sends the data in four respective RDMA SEND packets to the peer network device 24B.

Upon receiving each RDMA SEND packet, network device 24B writes the data in remote memory 36B, to the virtual memory space represented by the appropriate key and pattern, as specified by the corresponding RECEIVE work request. This process is repeated four times, using {K1, DEF (P1)}, {K2, DEF (P2)}, {K2, DEF (P1)} and {K1, DEF (P2)}.

In the example of FIG. 15, patterned access is performed in writing the data to the target memory (36B) by the target network device (24B). The initiator network device (24A) is not necessarily aware of the pattern, or even that the data it sends in the RDMA SEND packets will be stored using patterned readout. Thus, in this example, the initiator network device may be a conventional RDMA-capable device that does not support the disclosed techniques.

The message flows and message formats depicted in FIGS. 12-15 are example flows that are chosen purely for the sake of conceptual clarity. In alternative embodiments, any other flows and formats can be used.

In various embodiments, the disclosed techniques (including the "pre-association", "ad-hoc association" and "ad-hoc description" techniques) can be used with any of the opcodes and operations listed in the following table, for example:

|  | Gather | Scatter |
| --- | --- | --- |
| IB/RoCE SEND | Send WQE (requestor) | Receive WQE (responder) |
| IB/RoCE WRITE | Send WQE (requestor) | RDMA WRITE packet (responder) |
| IB/RoCE READ/ATOMIC | RDMA READ/ATOMIC packet (responder) | SEND WQE (requestor) |
| IB/RoCE SEND with tag matching offload | Send WQE (requestor) | TAG context (responder) |
| Ethernet packet | Send WQE | Receive WQE |
| Ethernet direct packet placement | N/A | Memory key affiliated with receive queue |

Nested Patterns

In some embodiments, system 20 or system 80, or system 128 to be described below, may use a "nested pattern" to specify a set of offsets at which data should be accessed in memory. In the present context, the term "nested pattern" means a pattern that comprises another pattern. A pattern that is an element within a nested pattern will be referred to herein as an "internal pattern".

The nesting format is a powerful tool that enables flexible yet compact specification of complex data patterns. For a complex pattern, a nested representation typically requires less memory space and is simpler for hardware to process and for a programmer to describe, in comparison with an exhaustive list of {size, offset} pairs. Nested patterns, as described in detail below, can be used with any of the disclosed techniques, e.g., "pre-association", "ad-hoc association" and "ad-hoc description".

Figure 16A:
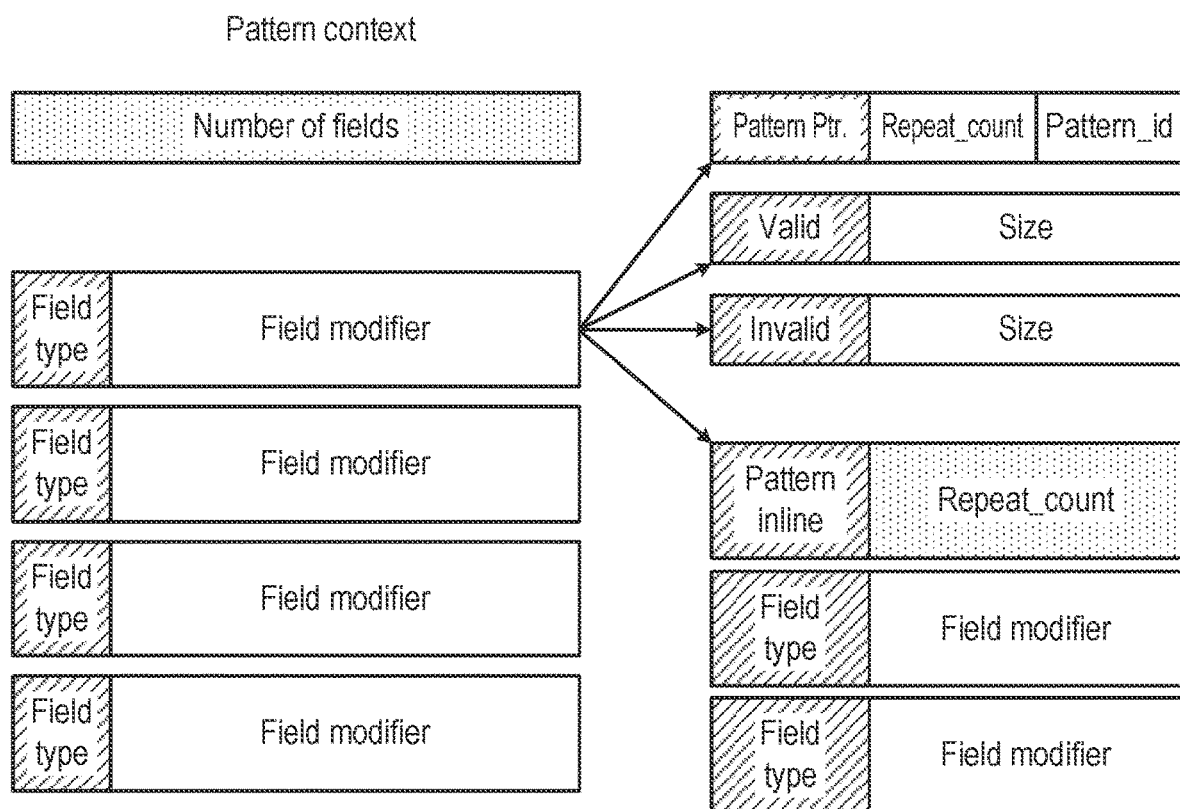
FIGS. 16A and 16B are diagrams that schematically illustrate nested patterns, in accordance with embodiments of the present invention.

FIG. 16A is a diagram that schematically illustrates an example of a nested pattern, in accordance with an embodiment of the present invention. The nested pattern is defined by a "pattern context" depicted on the left-hand side of the figure. The pattern context comprises a series of fields. A header, or prolog section, at the beginning of the pattern context specifies the number of fields. Each field has a fixed size (e.g., four bytes) and comprises a field type and a field modifier. The possible modifiers may vary from one field type to another.

Several example field types are depicted on the right-hand side of the figure:

Pattern pointer (ptr)—A field type indicating an array to be used as an internal pattern. The modifiers for this field type are (i) "Repeat count", indicating the number of times the internal pattern is to be repeated, and (ii) a "Pattern_id" assigned to the internal pattern.

Valid—A field type indicating a contiguous range of data that should be accessed. A "size" modifier specifies the size of the valid range, e.g., in bytes and/or in bits.

Invalid—A field type indicating a contiguous range of data that should be skipped. A "size" modifier specifies the size of the invalid range, e.g., in bytes and/or in bits. The "Invalid" field type can also be referred to as a "Skip" value. The skip value may be set to either a positive value or a negative value. A negative skip value specifies going back by a specified data size before accessing the next valid data.

Pattern inline—A field type that defines the internal pattern explicitly within the pattern context. In the present example, the inline pattern comprises a repeat count, followed by a series of fields each having a respective field type and modifier. Generally, fields in an inline pattern may differ in length from one another, depending on their type.

Figure 16B:
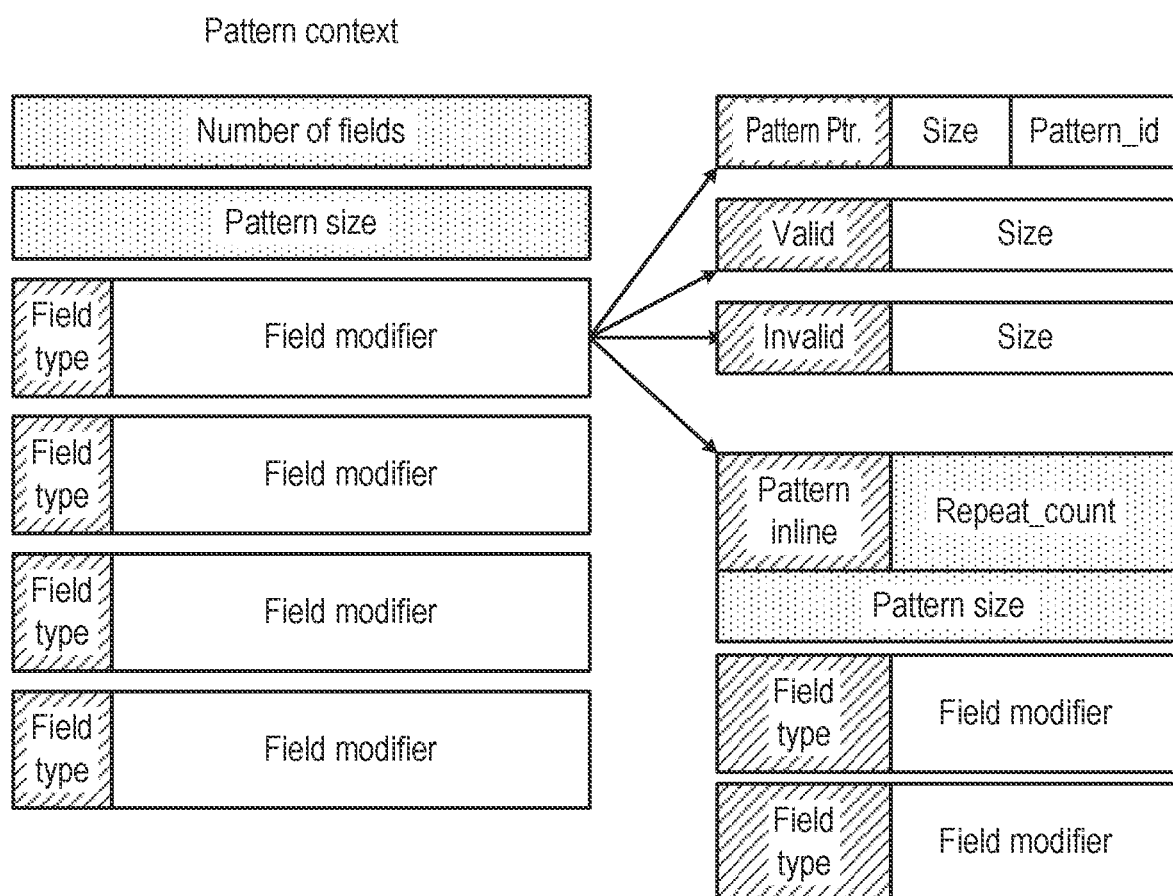

FIG. 16B is a diagram that schematically illustrates a nested pattern, in accordance with another embodiment of the present invention. The nested pattern definition of FIG. 16B differs from that of FIG. 16A in the following:

The prolog section of the pattern context also specifies the pattern size (e.g., in bytes and/or bits). A-priori definition of the pattern size may simplify hardware processing.

Similarly, the prolog section of the "inline pattern" field type also specifies the pattern size (e.g., in bytes and/or bits).

In the "pattern ptr" field type, the "repeat count" modifier is replaced with a "size" modifier that specifies the pattern size (e.g., in bytes and/or bits). This format is advantageous, for example, for specifying a non-integer number of repetitions. A non-integer number of repetitions is useful, for example, at the boundaries of memory regions.

The nested pattern formats of FIGS. 16A and 16B above are given purely by way of example. In alternative embodiments, any other suitable format can be used.

Nesting Example

Figure 17:
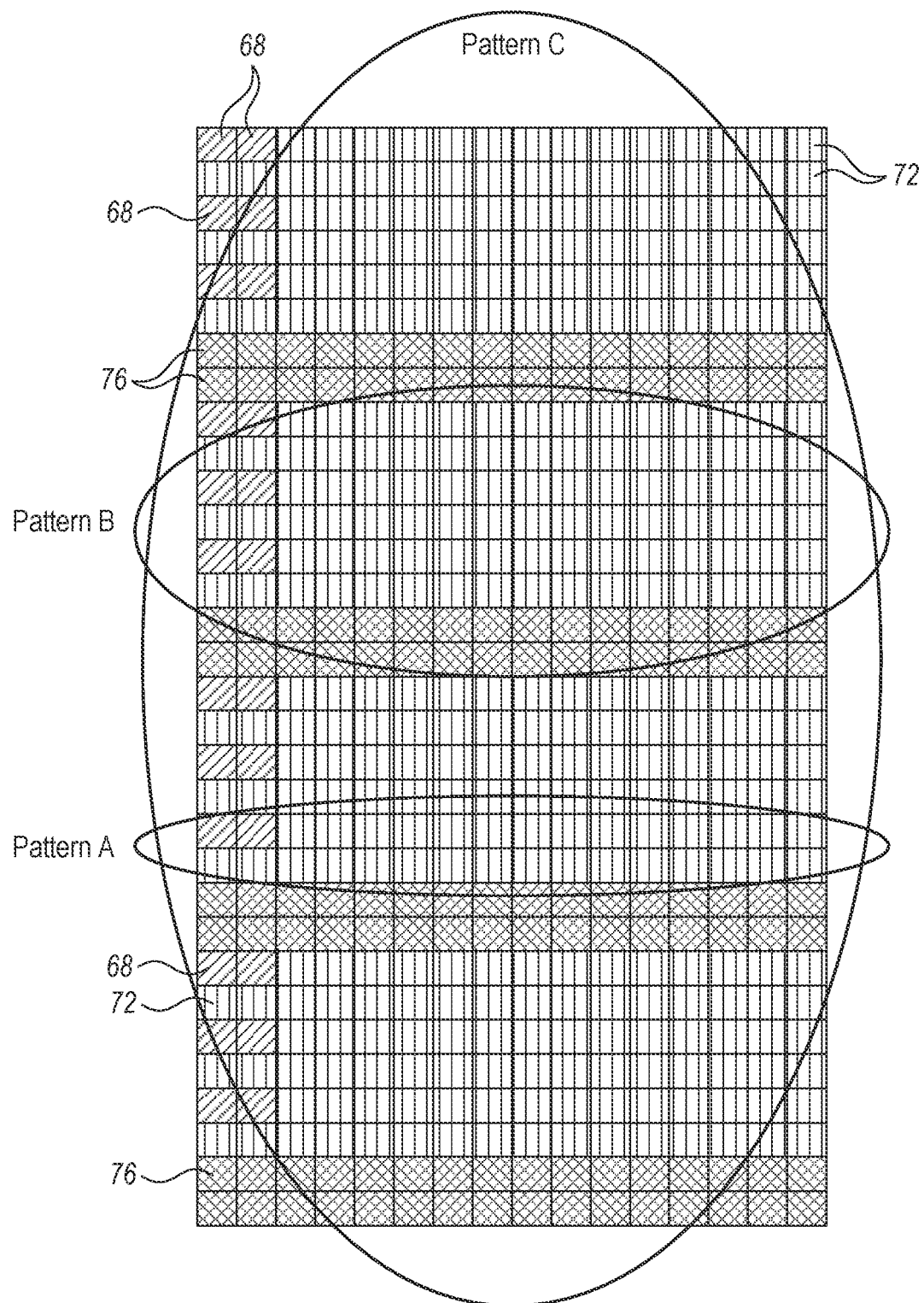
FIG. 17 is a diagram that schematically illustrates a pattern suitable for representation as a nested pattern, in accordance with an embodiment of the present invention.
Figure 18:
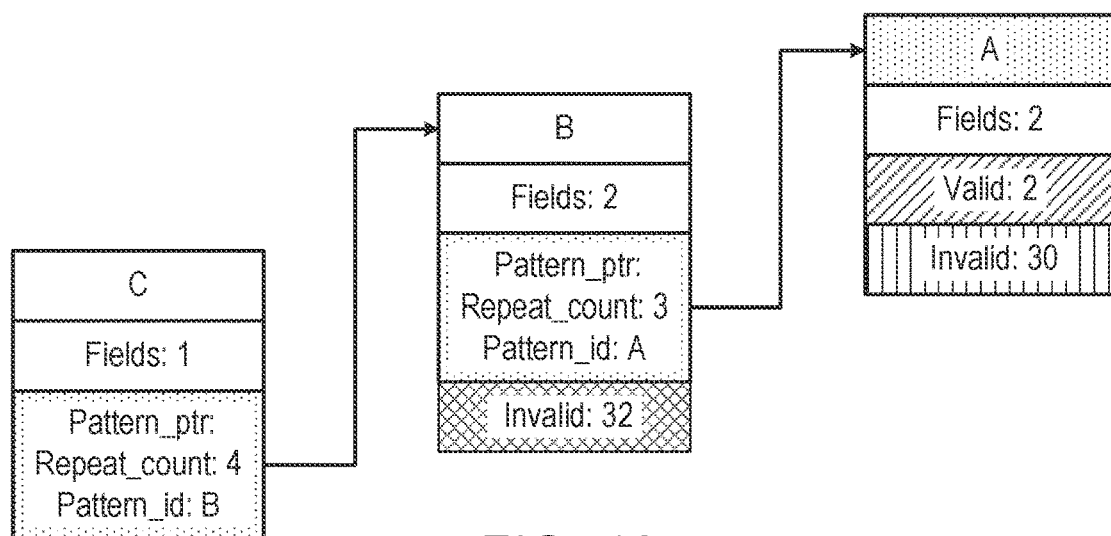
FIGS. 18 and 19 are diagrams that schematically illustrate representations of the pattern of FIG. 17 as nested patterns, in accordance with embodiments of the present invention.
Figure 19:
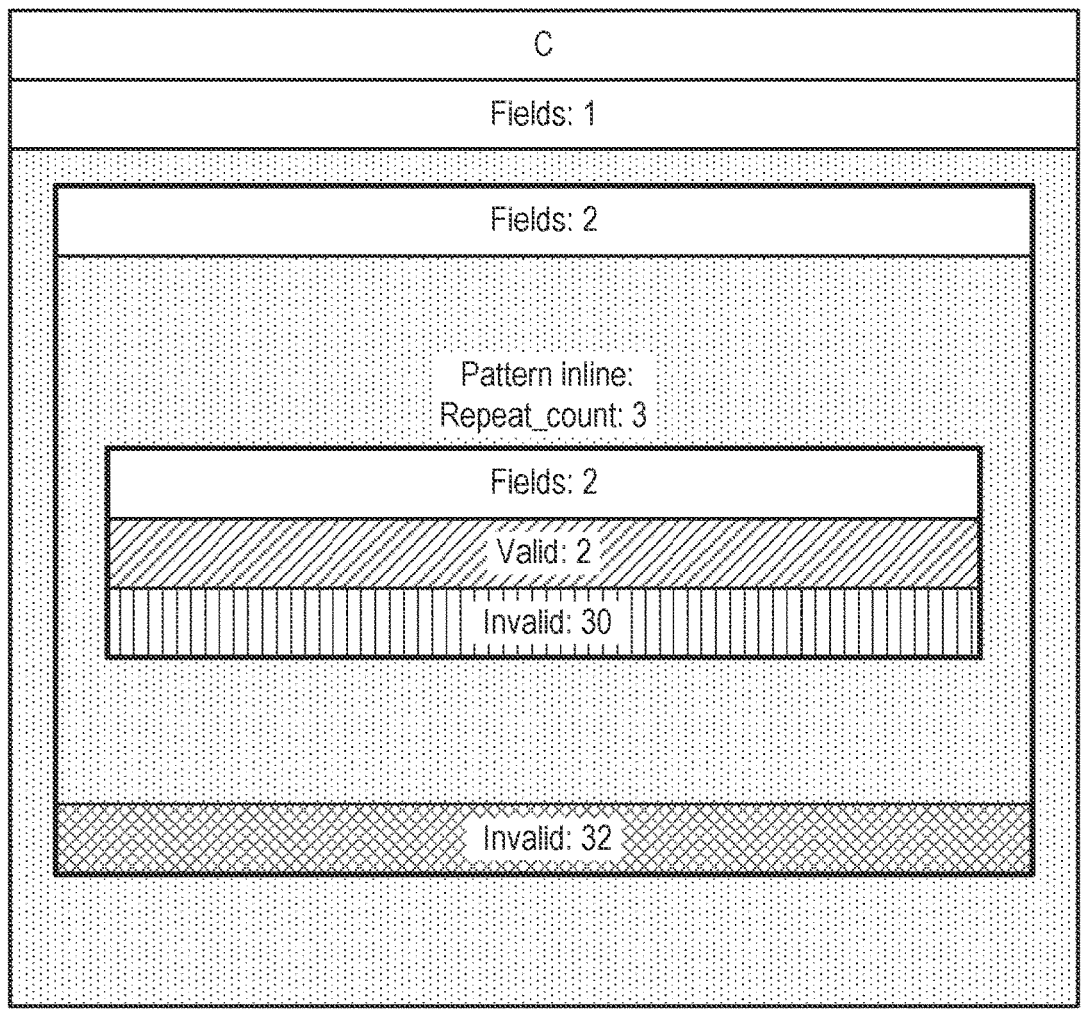

Reference is now made jointly to FIGS. 17-19. FIG. 17 is a diagram that schematically illustrates a pattern suitable for representation as a nested pattern. FIGS. 18 and 19 are diagrams that schematically illustrate representations of the pattern of FIG. 17 as nested patterns, in accordance with embodiments of the present invention.

Consider the pattern of FIG. 17. In this example, blocks 68 having diagonal hashing indicate bytes that should be accessed. Blocks 72 having vertical hashing, and block 76 having cross-hatched hashing, indicate bytes that should be skipped. The pattern of FIG. 17 can be represented efficiently using three patterns, denoted A, B and C:

Pattern A: An internal pattern that specifies two valid bytes (diagonal hashing) followed by thirty invalid bytes (vertical hashing).

Pattern B: An internal pattern that specifies three repetitions of pattern A, followed by thirty-two invalid bytes (cross-hatched hashing).

Pattern C: A nested representation of the pattern of FIG. 17, specifying four repetitions of pattern B.

FIG. 18 illustrates one way of representing the pattern of FIG. 17 using nesting. The representation of FIG. 18 uses three separate pattern contexts, for patterns A, B and C. The pattern context of pattern C points to pattern B and specifies four repetitions thereof. The pattern context of pattern B points to pattern A and specifies three repetitions thereof, each repetition followed by thirty-two invalid bytes. The pattern context of pattern A specifies the smallest building block—two valid bytes followed by thirty invalid bytes.

FIG. 19 illustrates an alternative nested representation of the pattern of FIG. 17. The representation of FIG. 19 uses a single pattern context defining pattern C. This representation is more compact than that of FIG. 18, but more complex to define and parse.

Iterative Patterns

In most of the embodiments described above, the patterns are selective in accessing specified portions of data, but they generally follow the order in which the data is stored in the (possibly virtual) buffer. In some use-cases, however, it is desirable to access the data out-of-order. One such scenario occurs in accessing multiple columns of a matrix one after the other.

In some embodiments, system 20 or system 80, or system 128 to be described below, uses a type of pattern that is referred to herein as an "iterative pattern" for specifying this sort of out-of-order access compactly and flexibly. Iterative patterns can be used with any of the disclosed techniques, such as "pre-association", "ad-hoc association" and "ad-hoc description".

Figure 20:
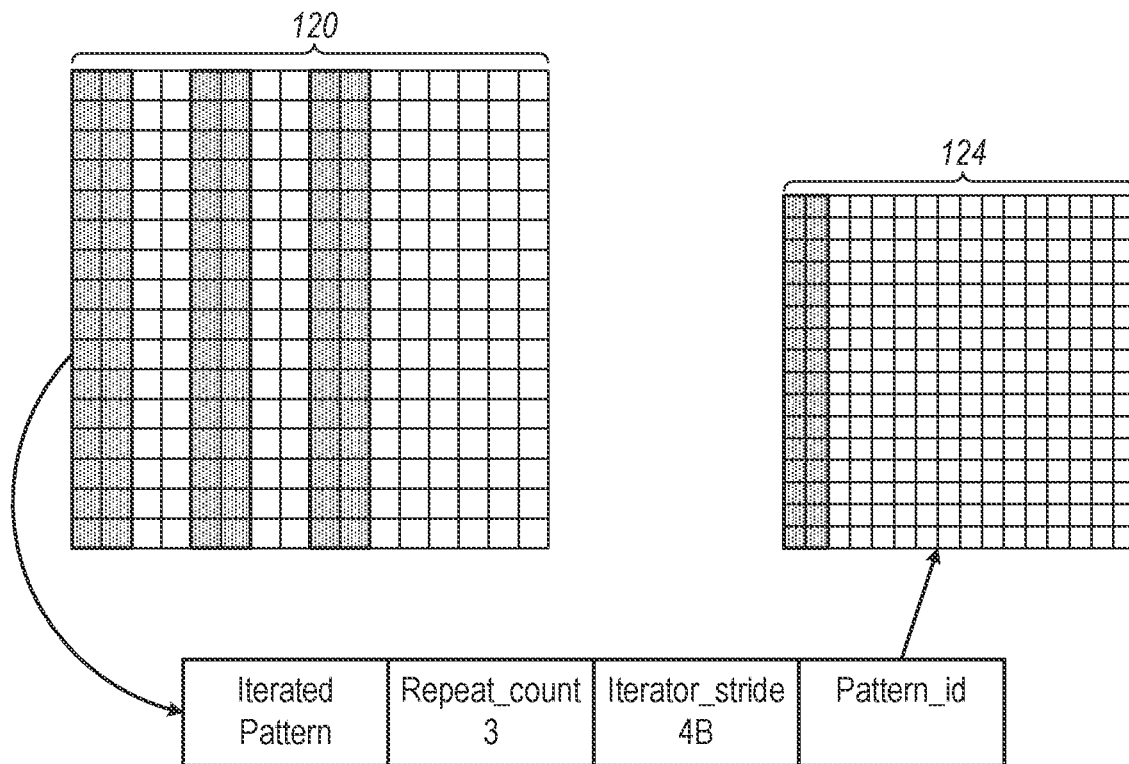
FIG. 20 is a diagram that schematically illustrates an iterative pattern, in accordance with an embodiment of the present invention.

FIG. 20 is a diagram that schematically illustrates an iterative pattern, in accordance with an embodiment of the present invention. In the present example, a matrix 120 is made-up of eight two-byte columns, and it is desired to access (read or write, e.g., using a "scatter" or "gather" command) the first, third and fifth columns of the matrix one after the other. In other words, the first column should be accessed in its entirety, then the third column in its entirety, and then the fifth column in its entirety.

In an embodiment, this access pattern is specified compactly using the iterative pattern seen at the bottom of the figure. In addition to the pattern type ("Iterated pattern"), the pattern is specified in terms of three fields—"Repeat_count", "Iterator_stride" and "Pattern_id". The "Pattern_id" points to a pattern 124 that defines the basic pattern to be iterated, in the present example a single matrix column. The "Repeat_count" field specifies the number of times the basic pattern is to be repeated, in the present example three times (3). The "Iterator_stride" field specifies the offset between successive iterations of the basic pattern, in the present example four bytes (4B). Note that the "Iterator_stride" value may be set to either a positive value or a negative value. A negative value enables, for example, accessing a descending order of columns.

The example pattern seen in FIG. 20 is chosen purely for the sake of clarity. In alternative embodiments, any other suitable iterative patterns can be used.

Patterned Memory-Network Data Transfer

In some embodiments, the disclosed patterns, pattern registration and pattern association schemes, e.g., "pre-association", "ad-hoc association" and "ad-hoc description", can be used for non-RDMA, memory-network data transfer. In these embodiments, the network device at one end of the transaction may not support the disclosed techniques. Two example use-cases are:

A network device (e.g., NIC) gathers data from a memory according to a pattern, and sends the gathered data over a network to a peer network device. The peer network device may be a conventional network device, which is not aware that the data it receives was gathered in accordance with a pattern.

A network device (e.g., NIC) receives data from a peer network device over a network, and writes (scatters) the received data to a memory according to a pattern. The peer network device may be a conventional network device that is unaware that the data it sent will be written to memory according to a pattern.

Figure 21:
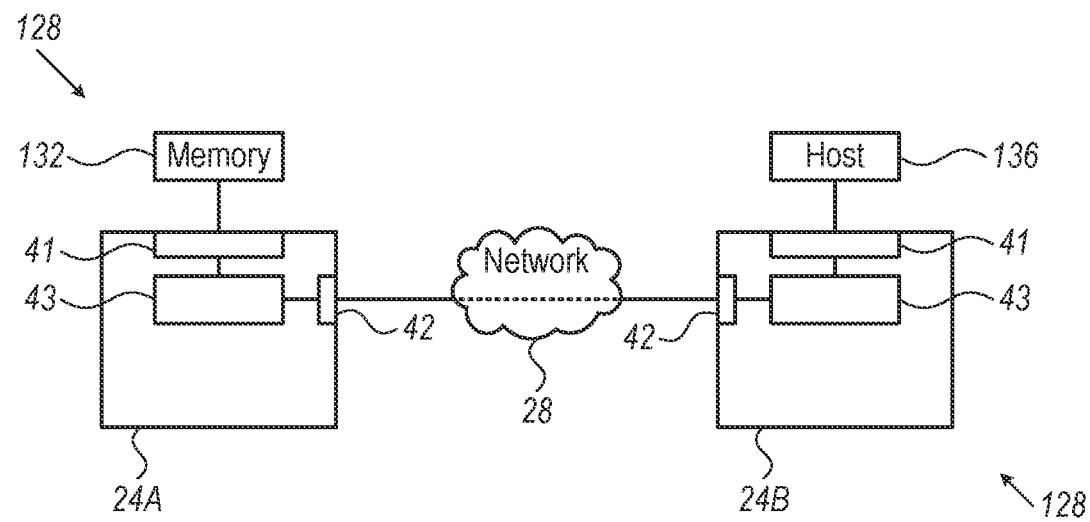
FIG. 21 is a block diagram that schematically illustrates a communication system that uses patterned memory-network data transfer, in accordance with an embodiment of the present invention.

FIG. 21 is a block diagram that schematically illustrates a communication system 128 that uses patterned memory-network data transfer, in accordance with an embodiment of the present invention. System 128 comprises two network devices 24A and 24B that communicate with one another over a network 28.

Network device 24A is connected to a memory 132, e.g., over a local bus such as a PCIe, CXL, Nvlink or Nvlink-C2C bus. In alternative embodiments, memory 132 may be located at any other suitable location, e.g., internally in network device 24A. Memory 132 may comprise, for example, a RAM. Network device 24B is connected to a host 136. In some embodiments network 28 is an IB network, and network devices 24A and 24B are IB HCAs. In other embodiments network 28 is an Ethernet network, and network devices 24A and 24B are Ethernet NICs.

Network devices 24A and 24B comprises respective host interfaces 41 for communicating with memory 132 and with host 136, respectively. Each of network devices 24A and 24B further comprises a network interface 42 for communicating with network 28, and processing circuitry 43.

Unlike the configuration of FIG. 1A above, in the embodiment of FIG. 21 network 24B need not necessarily support the disclosed patterning techniques. In network device 24A, circuitry 43 carries out the disclosed techniques. Circuitry 43 may use any of the disclosed patterns, pattern registration and pattern association schemes, e.g., "pre-association", "ad-hoc association" and "ad-hoc description" for memory-network data transfer.

In one embodiment, circuitry 43 in network device 24A receives a request from a work requestor (not seen in the figure), e.g., via host interface 41, to gather data from memory 132 according to a specified pattern, and to send the gathered data over network 28. The request typically specifies a memory key, which defines a memory space to be accessed in memory 132. Circuitry 43 gathers the data from memory according to the key and pattern, and sends the data to network device 24B, e.g., in Ethernet or IB packets.

In another embodiment, circuitry 43 in network device 24A receives a request from a work requestor, e.g., via host interface 41, to scatter data that is received over the network to memory 132 according to a pattern. The request typically specifies a memory key, which defines a memory space to be accessed in memory 132 for the scattering operation. Circuitry 43 receives the data over the network from network device 24B, e.g., in Ethernet or IB packets, and writes the data to memory 132 in accordance with the pattern.

FIGS. 22-27 are message diagrams that schematically illustrate patterned memory-network data transfer transactions, carried out by network device 24A of FIG. 21, in accordance with embodiments of the present invention. The patterning aspects of the transactions of FIGS. 22-27 are similar to the transactions in FIGS. 5-15 above, but in the present embodiments the transactions are not RDMA transactions, and the data is transferred over the network in conventional packets or messages.

Figure 22:
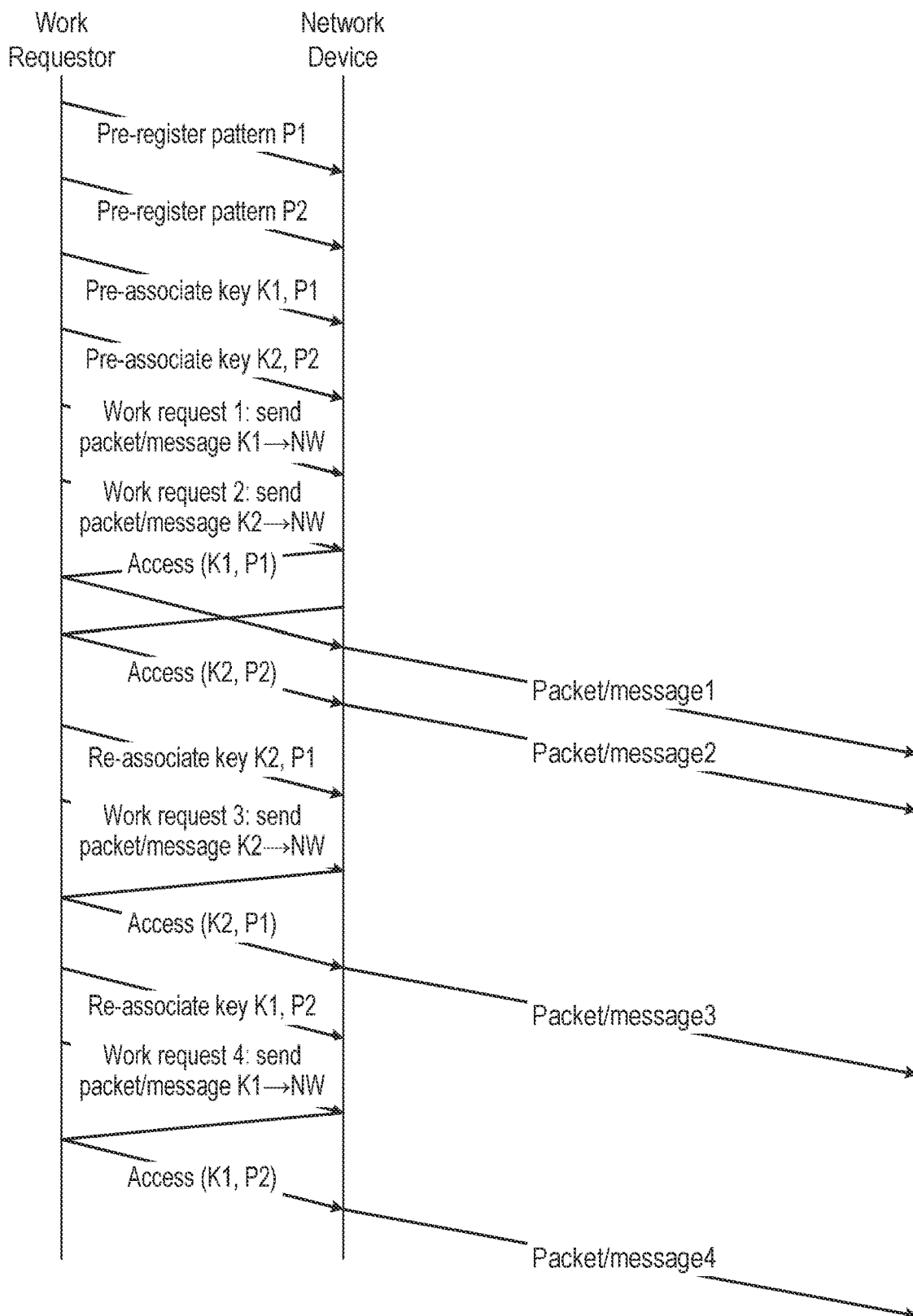
FIGS. 22-27 are message diagrams that schematically illustrate patterned memory-network data transfer transactions, in accordance with embodiments of the present invention.

FIG. 22 illustrates a memory-network gather transaction using pattern-key pre-association. The transaction is similar to the transaction of FIG. 5 above. The data is sent over the network in suitable packets or messages.

Figure 23:
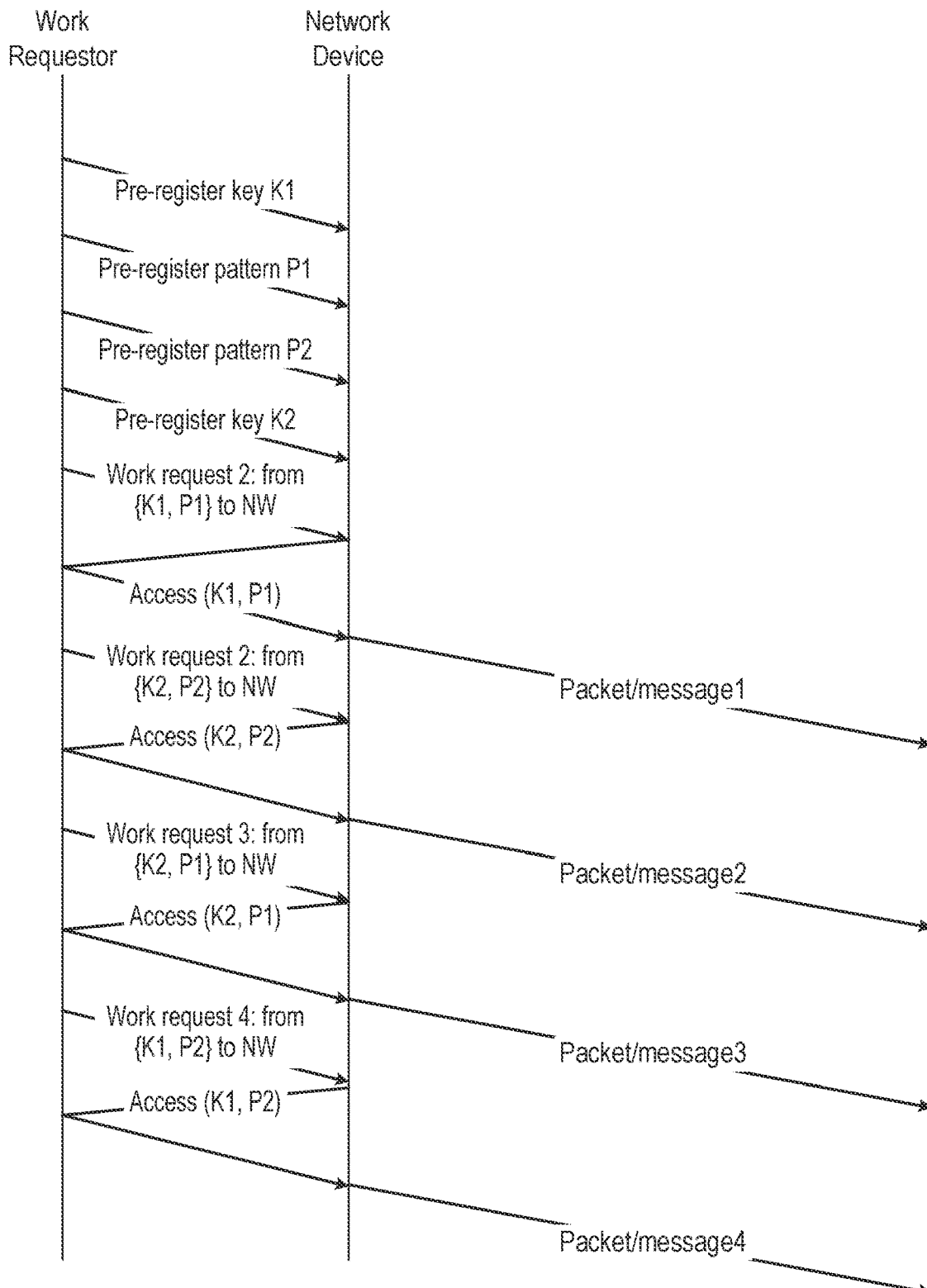

FIG. 23 illustrates a memory-network gather transaction using ad-hoc pattern-key association. The transaction is similar to the transaction of FIG. 9 above.

Figure 24:
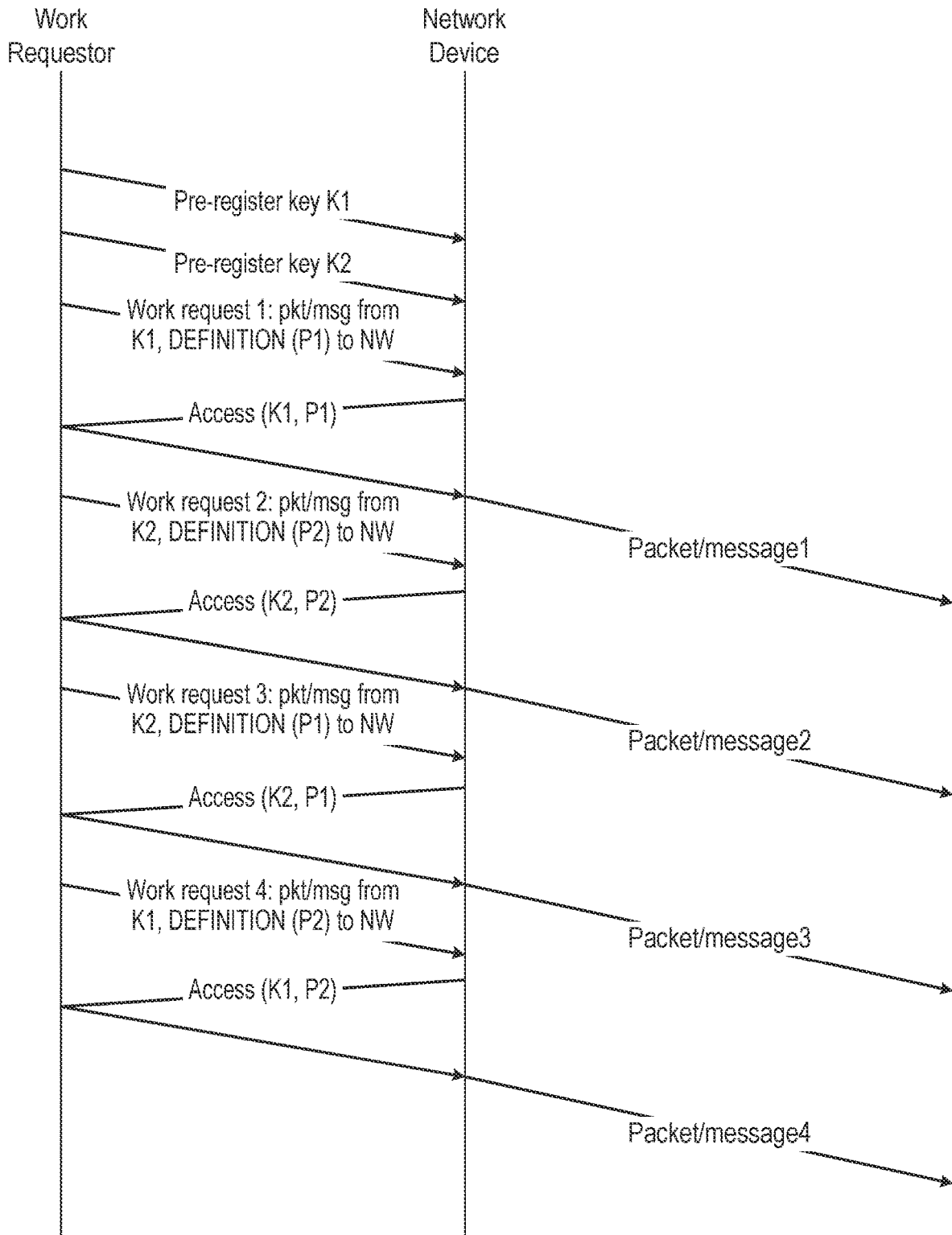

FIG. 24 illustrates a memory-network gather transaction using ad-hoc pattern definition. The transaction is similar to the transaction of FIG. 13 above.

Figure 25:
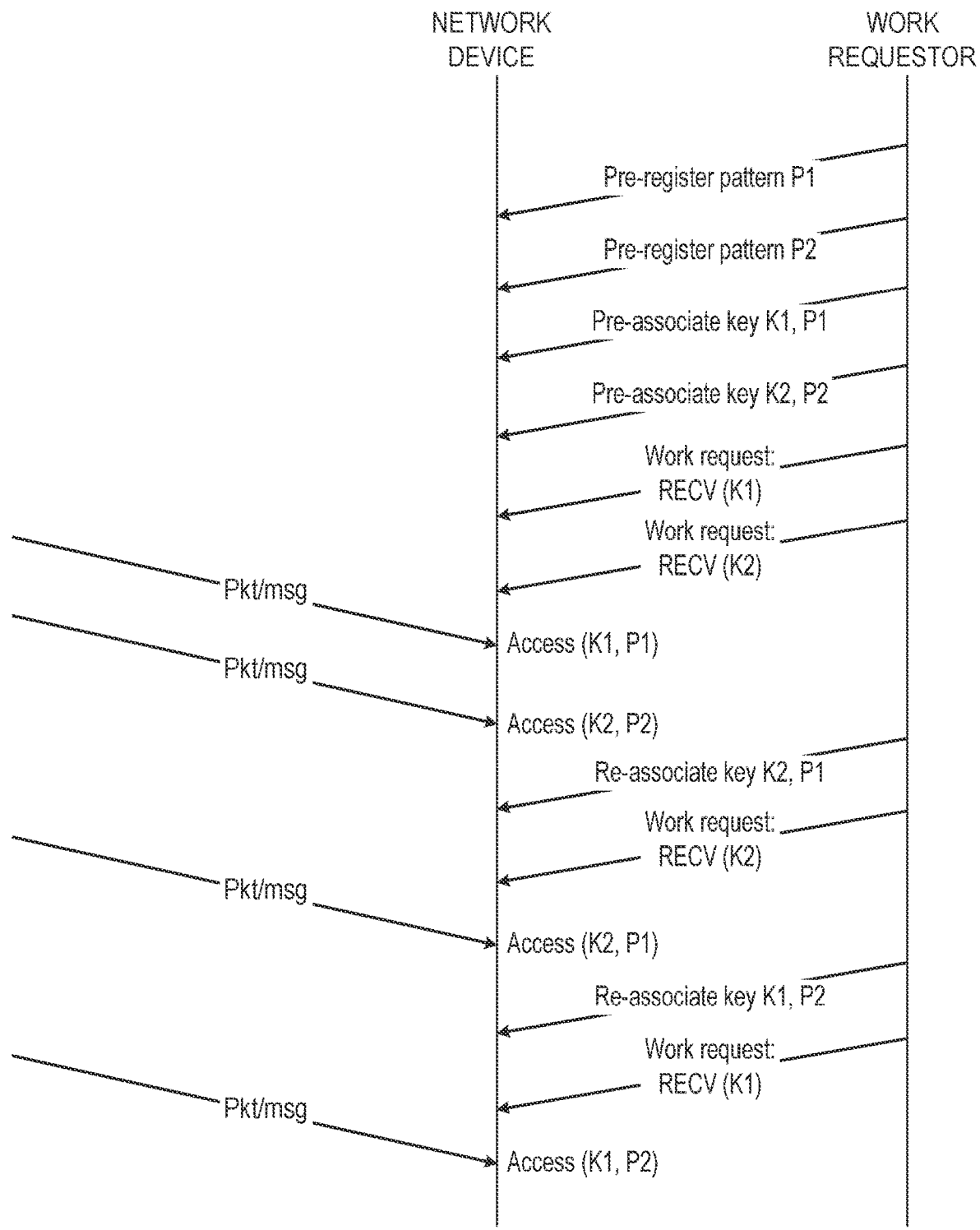

FIG. 25 illustrates a memory-network scatter transaction using pattern-key pre-association. The transaction is similar to the transaction of FIG. 7 above.

Figure 26:
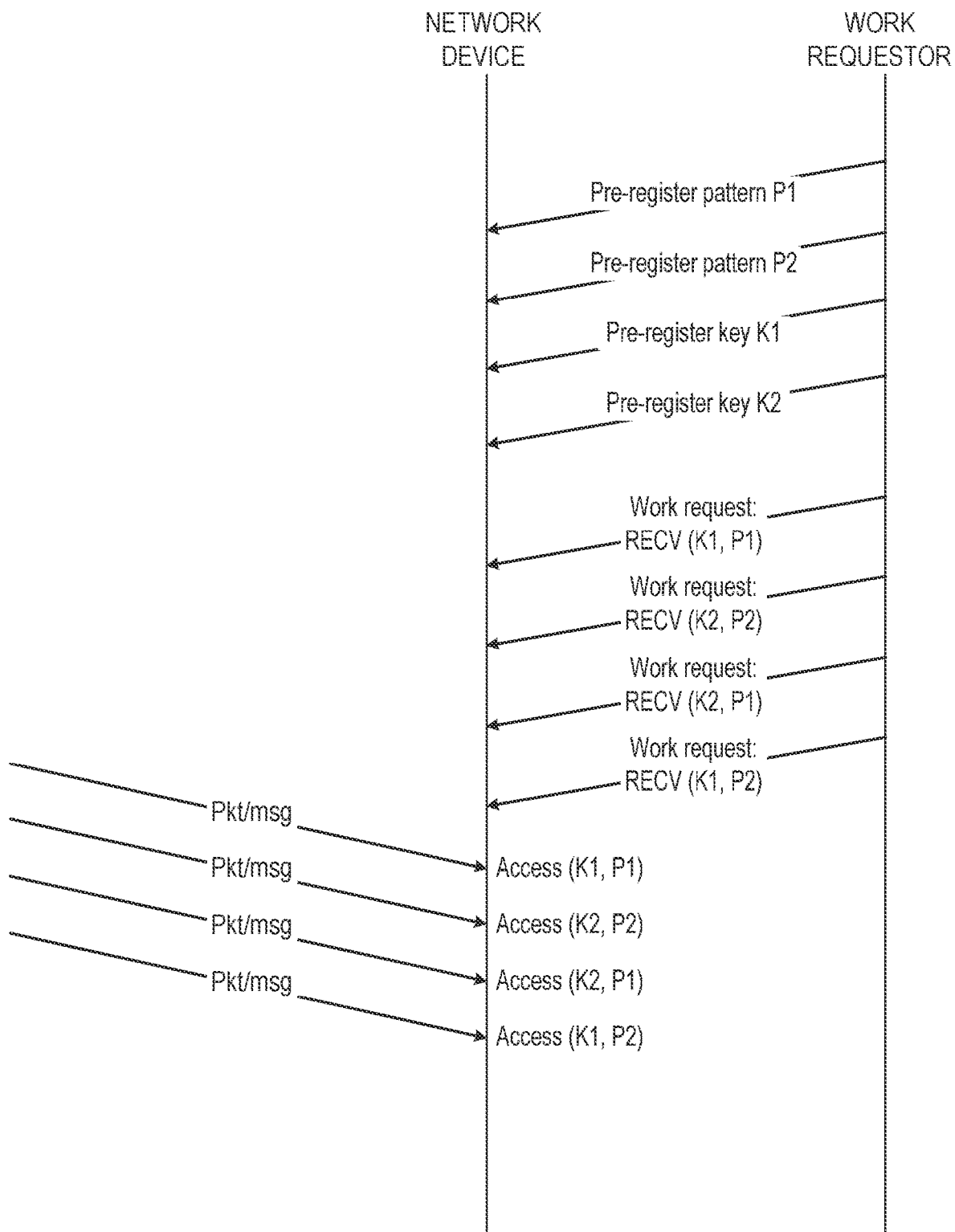

FIG. 26 illustrates a memory-network scatter transaction using ad-hoc pattern-key association. The transaction is similar to the transaction of FIG. 11 above.

Figure 27:
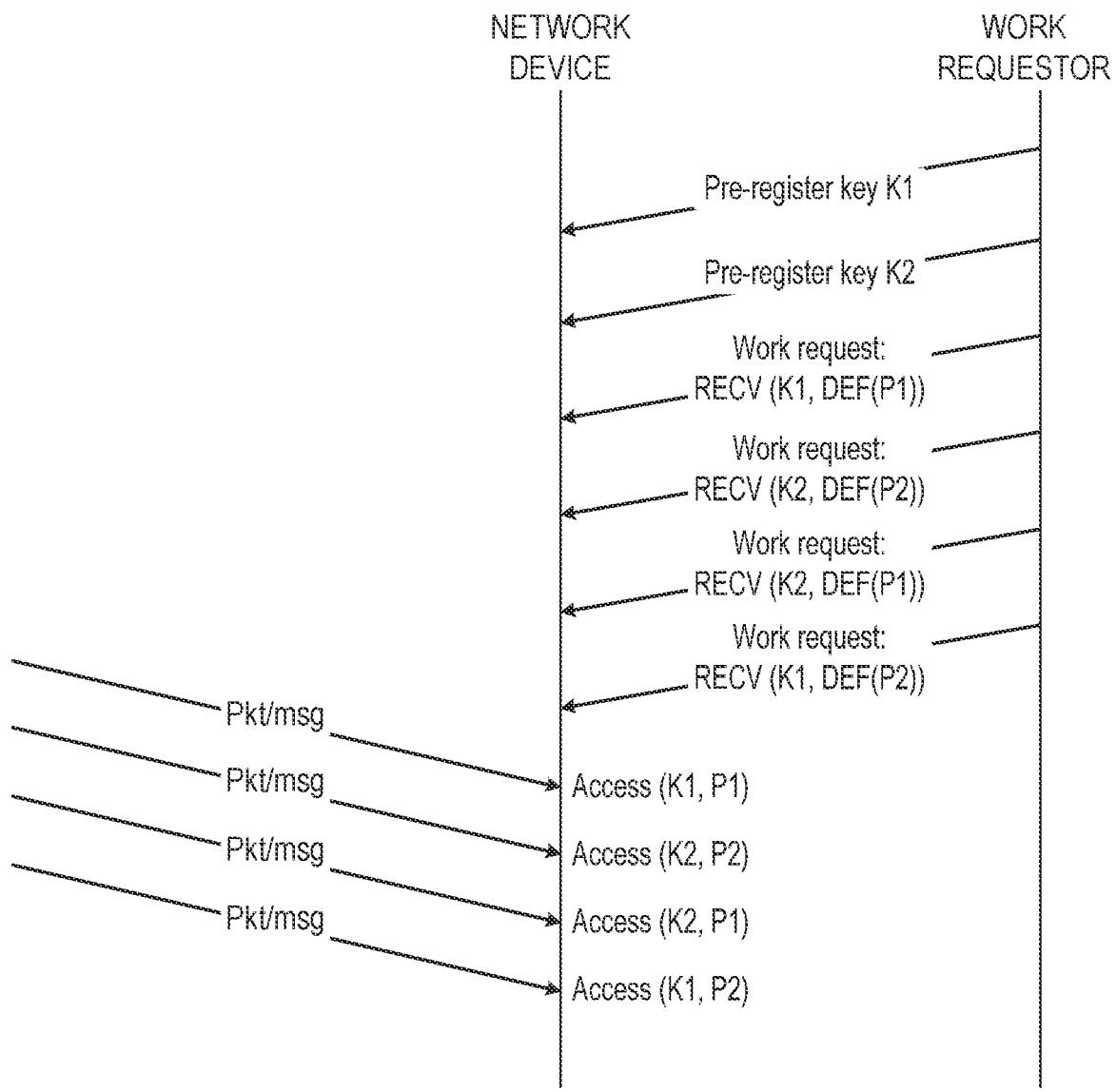

FIG. 27 illustrates a memory-network scatter transaction using ad-hoc pattern definition. The transaction is similar to the transaction of FIG. 15 above.

The configurations of systems 20, 80 and 128 and their various components, e.g., network devices 24A and 24B and DMA device 86, as shown in FIGS. 1A, 1B and 21, are example configurations that are chosen purely for the sake of conceptual clarity. Any other suitable configurations can be used in alternative embodiments. For example, FIG. 1A shows only two network devices, for the sake of clarity and simplicity. Real-life systems typically comprise multiple network devices serving multiple work requestors and memories. Such a system may comprise, for example, a data center, a high-performance computing cluster, or any other suitable system.

In various embodiments, the various components of systems 20, 80 and 128, e.g., network devices 24A and 24B including host interfaces 41, network interfaces 42 and circuitries 43, and DMA device 86 including memory interface 100 and DMA engine 104, can be implemented using hardware, e.g., using one or more Application-Specific Integrated Circuits (ASIC) and/or Field-Programmable Gate Arrays (FPGA), using software, or using a combination of hardware and software components.

In some embodiments, certain components of network devices 24A and 24B and/or DMA device 86, e.g., some of the functions of circuitry 43 and/or DMA engine 104, may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although the embodiments described herein mainly address the use of patterns in memory access operations such as RDMA, DMA and data transfer between a memory and a network, the methods and systems described herein can also be used in other applications, such as in Remote Procedure Call (RPC) or in applications that involve offloading of data-shuffling operations. Data shuffling is described, for example, in U.S. patent application Ser. No. 17/590,339, entitled "Data Shuffle Offload," filed Feb. 1, 2022, which is assigned to the assignee of the present patent application and whose disclosure is incorporated herein by reference.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
a first interface, configured to communicate at least with a memory;
a second interface, configured to communicate over a network with a peer network device; and
circuitry, configured to pre-register a plurality of patterns of offsets, to pre-associate a memory key representing a memory space to be accessed with a given pattern from the plurality of patterns of offsets, to receive a request to transfer data over the network between the memory and the peer network device, wherein the request indicates the memory key, but not the given pattern pre-associated with the memory key, and to transfer the data in accordance with the request using the memory key and the given pattern pre-associated with the memory key.

2. The network device according to claim 1, wherein the circuitry is configured to receive the request as a work-request via the first interface.

3. The network device according to claim 1, wherein each of the pre-registered patterns of offsets comprises one of (i) a pattern that accesses a contiguous memory space, (ii) a pattern that accesses a non-contiguous memory space, and (iii) a strided pattern.

4. The network device according to claim 1, wherein the request specifies multiple memory keys representing respective memory spaces to be accessed using the pattern.

5. The network device according to claim 1, wherein the memory space represented by the memory key is one of a virtual memory space and a physical memory space.

6. The network device according to claim 1, wherein, in response to receiving a re-association instruction, the circuitry is configured to associate the memory key with a different pattern.

7. The network device according to claim 1, wherein the pattern is pre-associated in the network device with at least one additional memory key.

8. The network device according to claim 1, wherein the request specifies a starting virtual address or initial offset parameter for the pattern.

9. The network device according to claim 1, wherein the pattern specifies the offsets using a nested representation that comprises at least one internal pattern.

10. The network device according to claim 1, wherein the pattern specifies the offsets using an iterative representation that defines (i) a basic pattern to be iterated multiple times, (ii) a number of times the basic pattern is to be iterated, and (iii) an offset between successive iterations of the basic pattern.

11. The network device according to claim 1, wherein the request is associated with a scatter or gather command.

12. The network device according to claim 1, wherein the request is associated with an InfiniBand transaction.

13. The network device according to claim 1, wherein the request is associated with an Ethernet transaction.

14. A method for data transfer, comprising:
in a network device, communicating with a memory and, over a network, with a peer network device;
pre-registering, in the network device, a plurality of patterns of offsets;
pre-associating a memory key representing a memory space to be accessed with a given pattern from the plurality of patterns of offsets;
receiving in the network device a request to transfer data over the network between the memory and the peer network device, wherein the request indicates the memory key, but not the given pattern pre-associated with the memory key; and
transferring the data in accordance with the request using the memory key and the given pattern pre-associated with the memory key.

15. The method according to claim 14, wherein receiving the request comprises receiving the request as a work-request via the first interface.

16. The method according to claim 14, wherein each of the multiple pre-registered patterns of offsets comprises one of (i) a pattern that accesses a contiguous memory space, (ii) a pattern that accesses a non-contiguous memory space, and (iii) a strided pattern.

17. The method according to claim 14, wherein the request specifies multiple memory keys representing respective memory spaces to be accessed using the pattern.

18. The method according to claim 14, wherein the memory space represented by the memory key is one of a virtual memory space and a physical memory space.

19. The method according to claim 14, and comprising, in response to receiving a re-association instruction, associating the memory key with a different pattern.

20. The method according to claim 14, wherein the pattern is pre-associated in the network device with at least one additional memory key.

21. The method according to claim 14, wherein the request specifies a starting virtual address or initial offset parameter for the pattern.

22. The method according to claim 14, wherein the pattern specifies the offsets using a nested representation that comprises at least one internal pattern.

23. The method according to claim 14, wherein the pattern specifies the offsets using an iterative representation that defines (i) a basic pattern to be iterated multiple times, (ii) a number of times the basic pattern is to be iterated, and (iii) an offset between successive iterations of the basic pattern.

24. The method according to claim 14, wherein the request is associated with a scatter or gather command.

25. The method according to claim 14, wherein the request is associated with an InfiniBand transaction.

26. The method according to claim 14, wherein the request is associated with an Ethernet transaction.

* * * * *